US007830564B2

(12) United States Patent
Harada et al.

(10) Patent No.: US 7,830,564 B2
(45) Date of Patent: Nov. 9, 2010

(54) METHOD OF OBTAINING CORRECTION VALUE OF OPTICAL SENSOR AND RECORDING APPARATUS

(75) Inventors: Kazumasa Harada, Nagano (JP); Kazuhiro Hashii, Nagano (JP); Satoshi Nakata, Nagano (JP); Hirohisa Adachi, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 390 days.

(21) Appl. No.: 11/517,850

(22) Filed: Sep. 7, 2006

(65) Prior Publication Data

US 2007/0055724 A1 Mar. 8, 2007

(30) Foreign Application Priority Data

Sep. 8, 2005 (JP) ............................ 2005-260559

(51) Int. Cl.
*H04N 1/40* (2006.01)
*H04N 1/46* (2006.01)

(52) U.S. Cl. ...................................... 358/504; 358/443

(58) Field of Classification Search ........... 358/1.1–1.9, 358/2.1, 3.15, 3.27, 494, 504, 406, 484, 488, 358/505, 474, 464, 447, 448, 443, 471; 347/19, 347/14, 15, 5, 9, 41, 42; 400/708–709
See application file for complete search history.

(56) References Cited

U.S. PATENT DOCUMENTS 5,644,229 A * 7/1997 Dossel et al. ............... 324/247
5,764,383 A * 6/1998 Saund et al. ................ 358/497
5,995,717 A * 11/1999 Tanaka ....................... 358/1.9
6,118,463 A * 9/2000 Houki et al. ................ 347/116
6,404,363 B1 * 6/2002 Park et al. ................... 341/110
6,594,028 B1 * 7/2003 Hamamoto et al. ........ 358/1.15
6,622,625 B1 * 9/2003 Sugiyama .................. 101/484
6,775,022 B2 * 8/2004 Noyes et al. ............... 358/1.15
7,419,238 B2 * 9/2008 Yoshida ....................... 347/19
2005/0104282 A1 * 5/2005 Mandai et al. .............. 271/227
2005/0160129 A1 * 7/2005 Endo .......................... 708/490

FOREIGN PATENT DOCUMENTS

JP A-08-088713 4/1996

(Continued)

Primary Examiner—Jerome Grant, II
(74) *Attorney, Agent, or Firm*—Nutter McClennen & Fish LLP; John J. Penny, Jr.; Rory P. Pheiffer

(57) ABSTRACT

A method of obtaining a correction value of an optical sensor detecting an edge of the medium so as to generate detection information, includes: acquiring edge information on an edge position of one of opposite edges of the medium based on the detection information; forming on the medium a correction value obtainment pattern including lines that are arranged at a fixed interval in a first direction and parallel to a second direction perpendicular to the first direction and that include a reference line spaced a first distance from the edge position in the first direction and parallel to the second direction, based on the edge information; specifying a line spaced the first distance from the edge position in the first direction; obtaining a second distance in the first direction between the specified line and the reference line; and determining the second distance as an absolute value of the correction value.

16 Claims, 19 Drawing Sheets

FOREIGN PATENT DOCUMENTS

| | | |
|---|---|---|
| JP | A-10-315545 | 12/1998 |
| JP | A-10-337908 | 12/1998 |
| JP | A-2003-320718 | 11/2003 |
| JP | A-2004-243741 | 9/2004 |
| JP | A-2005-103981 | 4/2005 |
| JP | A-2005-224977 | 8/2005 |

* cited by examiner

METHOD OF OBTAINING CORRECTION VALUE OF OPTICAL SENSOR AND RECORDING APPARATUS

BACKGROUND OF THE INVENTION

The present invention relates to a method for obtaining a correction value of an optical sensor used for detecting an edge of a recording medium, as well as to a recording apparatus.

In a recording apparatus typified by a facsimile, a printer, or the like, a carriage having a recording head used for performing a recording on a recording medium is sometimes equipped with an optical sensor capable of detecting optical reflectance of a transport path (converting the intensity of reflected light into a current value) and disposed at a position opposing the transport path of the recording medium.

For instance, as described in JP-A-2004-243741, this optical sensor is used for detecting the position of an end (edge) of a recording medium in an inkjet printer. Specifically, the intensity of reflected light differs between a state where the recording medium is present and a state where the recording medium is not present. Accordingly, the position of an edge (hereinafter often called an "edge position") of the recording medium can be acquired by means of detecting the difference. Thus, when the edge position of the recording medium can be accurately ascertained by means of the optical sensor directly detecting the edge position and when so-called frameless printing—e.g., a recording medium being printed to the edges—performed, the quantity of ink discarded in an area outside the edge of the recording medium can be minimized, the chance of generation of an ink mist can be minimized, and the volume of abandoned image data can be minimized. Accordingly, there is yielded an advantage of preventing loss of the originality of original image data.

However, if the positional relationship between the optical sensor and the recording head (an ink ejection nozzle) becomes deviated for reasons of an assembly error during assembly of an apparatus, even when the optical sensor has acquired the edge position of a recording medium, ink cannot be adhered to an appropriate position during actual recording operation by the recording head. An optical sensor has individual differences, and uniform detection accuracy of the optical sensor does not always exist among pieces of apparatus. Therefore, there arises a case where no coincidence exists between the edge position detected by the optical sensor and an actual edge position.

SUMMARY

It is therefore an object of the invention to enable a recording apparatus which acquires an edge position of a recording medium by means of an optical sensor to thus correct a discrepancy between the edge position recognized by the recording apparatus and an actual edge position, thereby enabling to effect recording at a more accurate position.

In order to achieve the object, according to the invention, there is provided a method of obtaining a correction value used for correcting a detection error in an optical sensor opposing a transport path in which a medium is transported and operable to detect a change in optical reflectance of the transport path to thereby detect an edge of the medium so as to generate detection information, the method comprising:

acquiring edge information on an edge position of one of opposite edges of the medium based on the detection information;

forming on the medium a correction value obtainment pattern including lines that are arranged at a fixed interval in a first direction and parallel to a second direction perpendicular to the first direction so as to form a step shape and that include a reference line which is located at a position spaced a first distance from the edge position in the first direction and which is parallel to the second direction, based on the edge information;

specifying a line which is located at a position spaced the first distance from the edge position in the first direction and which corresponds to one of the lines of the correction value obtainment pattern, by means of actual measurement performed by an operator;

obtaining a second distance in the first direction between the specified line and the reference line, based on line information on the specified line; and determining the second distance as an absolute value of the correction value.

With this configuration, the correction value obtainment pattern having a step shape is formed on the medium. The second distance between the reference line formed at a position spaced from the detected edge position by the first distance and a line located at a position spaced from the actually edge position by the first distance is determined as the correction value (a detection error) of the optical sensor. Accordingly, the correction value of the optical sensor can be readily and accurately determined. Consequently, a difference between the edge position detected by the optical sensor and an actual edge position is corrected, thereby detecting a more accurate position.

The first direction may be a main scanning direction, the second direction may be a sub scanning direction, and the opposite edges of the medium may be opposite edges of the medium in the second direction.

The first direction may be a sub scanning direction, the second direction may be a main scanning direction, and the opposite edges of the medium may be a leading edge and a trailing edge of the medium in the first direction.

In the acquiring process of the edge information, the edge position may include two edge points spaced at a predetermined interval from each other in the second direction, the method may further include obtaining an inclination angle between a line connecting the two edge points and a line parallel to the second direction based on the edge information; and obtaining an inclination error caused by inclination of the medium with respect to the line parallel to the second direction, based on the inclination angle, and In the determining process, a sum of the second distance and the inclination error may be determined as the absolute value of the correction value.

In this case, the edge position is acquired, by reference to information from the optical sensor, as two edge points spaced at an appropriate interval from each other. By reference to the thus-acquired two edge points, the inclination angle of the medium is determined. The absolute value of the correction value of the optical sensor is determined from the inclination angle. Accordingly, even when the medium is inclined, as in the case where the medium has been fed in a skewed manner, where the medium is not formed into an exact rectangular form, or the like, the factor for such an inclination is eliminated, and a correction value for the optical sensor can be determined accurately.

The method may further include obtaining an intermediate point between the two edge points, and obtaining a third distance in the second direction between an intermediate point of the specified line and the intermediate point between the two edge points. The inclination error is defined as Hb, the third distance is defined as W, and the inclination angle is defined as θ, such that the following equation may be satisfied, $Hb=W\times\tan\theta$.

The method may further include obtaining an intermediate point between the two edge points. An intermediate point of the reference line may correspond to the intermediate point between the two edge points in the first direction.

In order to achieve the object, according to the invention, there is provided a recording apparatus comprising:

a transporter, operable to transport a recording medium in a transport path;

an optical sensor, opposing the transport path, and operable to detect a change in optical reflectance of the transport path to thereby detect an edge of the recording medium so as to generate detection information;

a controller, operable to acquire edge information on an edge position of one of opposite edges of the recording medium based on the detection information;

a recording head, operable to form on the recording medium a correction value obtainment pattern including lines that are arranged at a fixed interval in a first direction and parallel to a second direction perpendicular to the first direction so as to form a step shape and that include a reference line which is located at a position spaced a first distance from the edge position in the first direction and which is parallel to the second direction, based on the edge information; and an ejector, operable to eject the recording medium on which the correction value obtainment pattern has been formed, wherein an operator specifies a line which is located at a position spaced the first distance from the edge position in the first direction and which corresponds to one of the lines of the correction value obtainment pattern by means of actual measurement, and inputs line information on the specified line to the controller, and the controller obtains a second distance in the first direction between the specified line and the reference line based on the line information, and determines the second distance as an absolute value of the correction value.

With this configuration, the correction value obtainment pattern having a step shape is formed on the recording medium. By reference to information about the line located at a position which is spaced the first distance from the actual edge position, the correction value (a detection error) of the optical sensor is determined. Accordingly, the correction value of the optical sensor can be readily and accurately determined. Consequently, a difference between the edge position ascertained by the recording apparatus and the actual edge position is corrected, thereby enabling recording operation at a more accurate position.

The first direction may be a main scanning direction, the second direction may be a sub scanning direction, and the opposite edges of the recording medium may be opposite edges of the recording medium in the second direction.

The first direction may be a sub scanning direction, the second direction may be a main scanning direction, and the opposite edges of the recording medium may be a leading edge and a trailing edge of the recording medium in the first direction.

The edge position may include two edge points spaced at a predetermined interval from each other in the second direction, the controller may obtain an inclination angle between a line connecting the two edge points and a line parallel to the second direction based on the edge information, the controller may obtain an inclination error caused by inclination of the recording medium with respect to the line parallel to the second direction based on the inclination angle, and the controller may determine a sum of the second distance and the inclination error as the absolute value of the correction value.

In this case, the edge position of the recording medium is acquired, by reference to information from the optical sensor, as two edge points spaced at an appropriate interval from each other. By reference to the thus-detected two edge points, the inclination angle of the recording medium is determined. The absolute value of the correction value of the optical sensor is determined from the inclination angle. Accordingly, even when the recording medium is inclined, as in the case where the recording medium has been fed in a skewed manner, where the recording medium is not formed into an exact rectangular form, or the like, the factor for such an inclination is eliminated, and a correction value for the optical sensor can be determined accurately.

The controller may obtain an intermediate point between the two edge points, the controller may obtain a third distance in the second direction between an intermediate point of the specified line and the intermediate point between the two edge points, and the inclination error is defined as Hb, the third distance is defined as W, and the inclination angle is defined as θ, such that the following equation may be satisfied, $Hb=W\times\tan\theta$.

The controller may obtain an intermediate point between the two edge points, and an intermediate point of the reference line may correspond to the intermediate point between the two edge points in the first direction.

DETAIL DESCRIPTION OF PREFERRED EMBODIMENTS

Embodiments of the present invention will be described hereunder by reference to the drawings.

Figure 1:
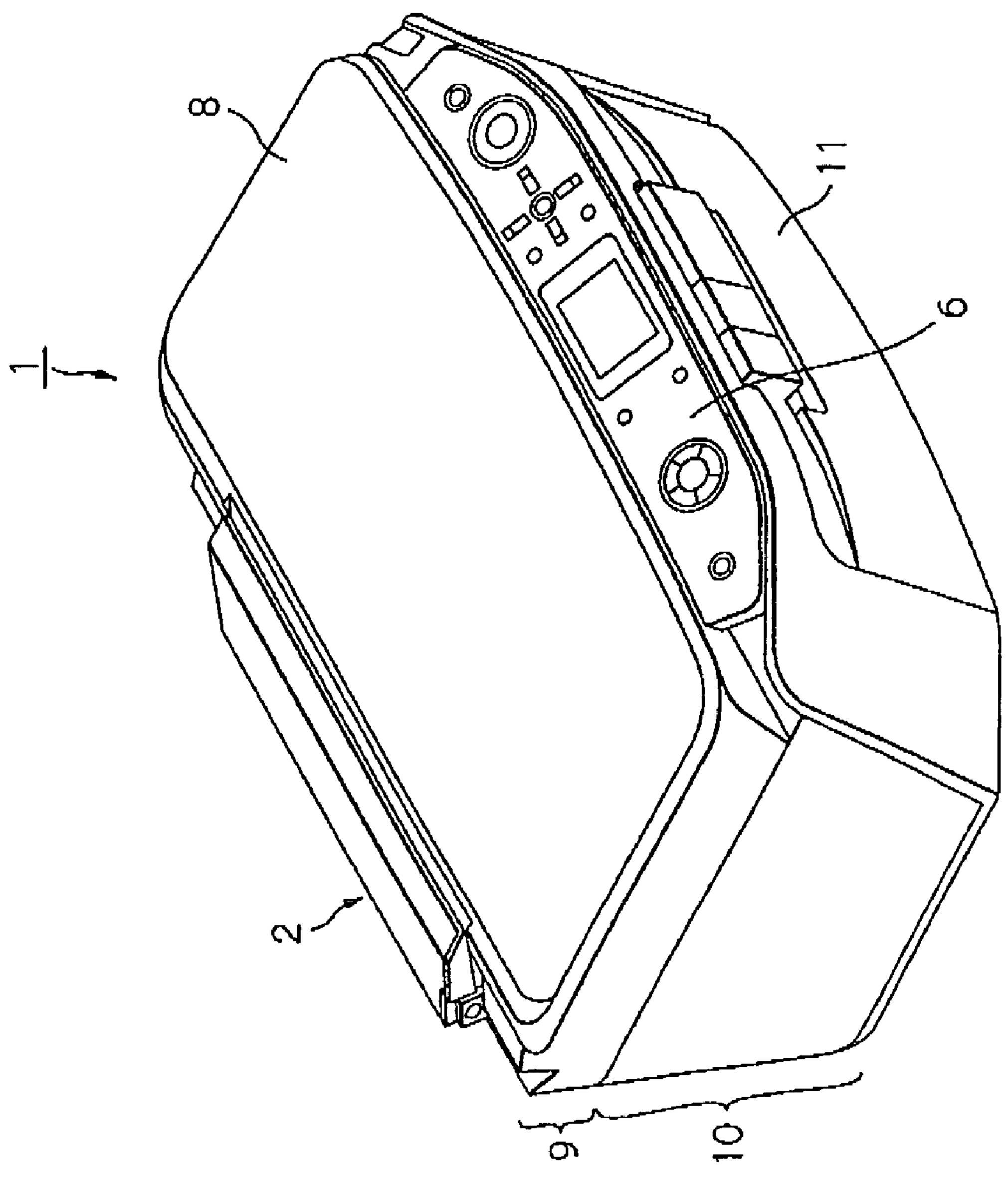
FIG. 1 is an external perspective view of a printer section.
Figure 2:
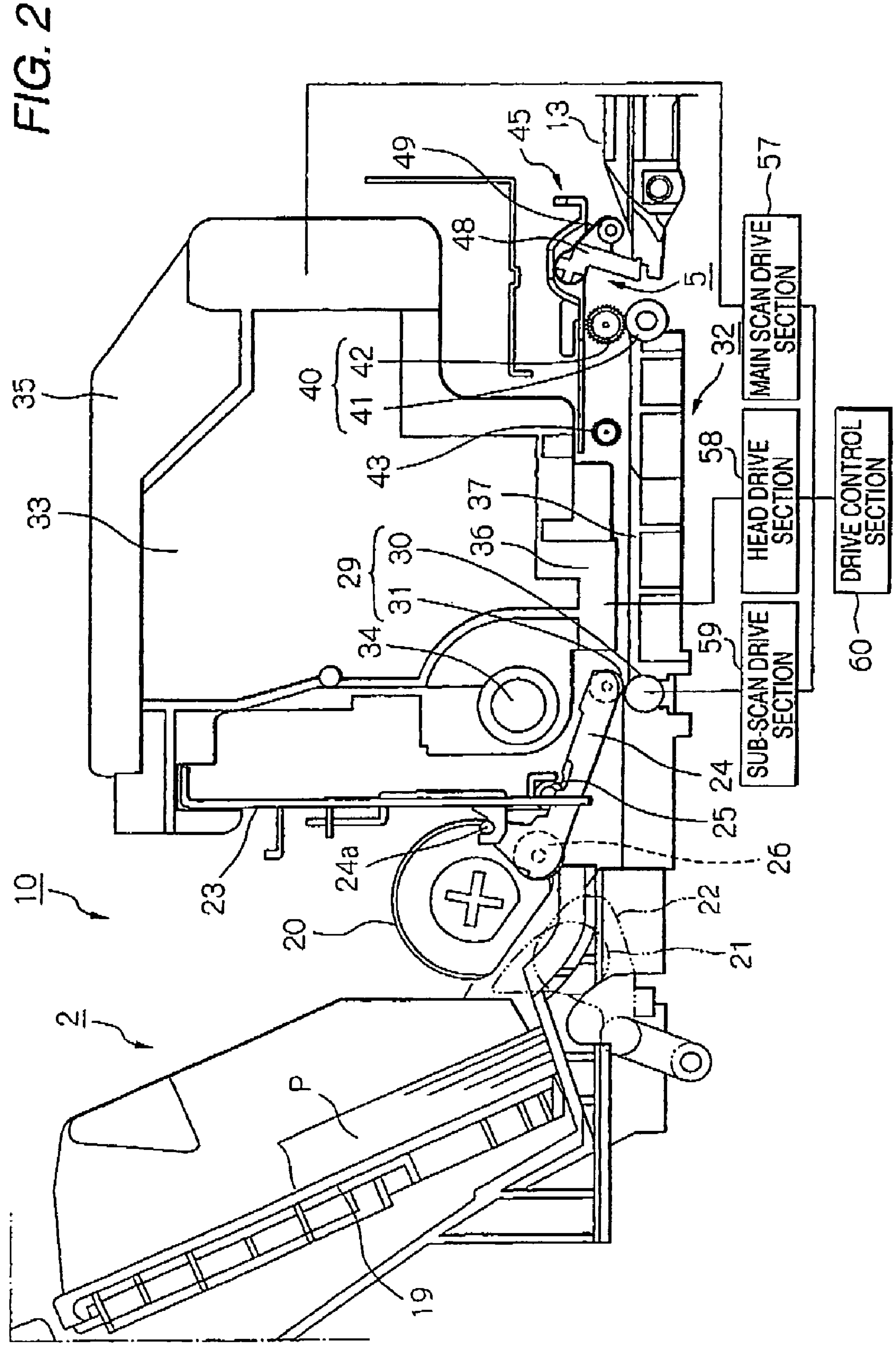
FIG. 2 is a side cross-sectional view of the printer section.
Figure 3:
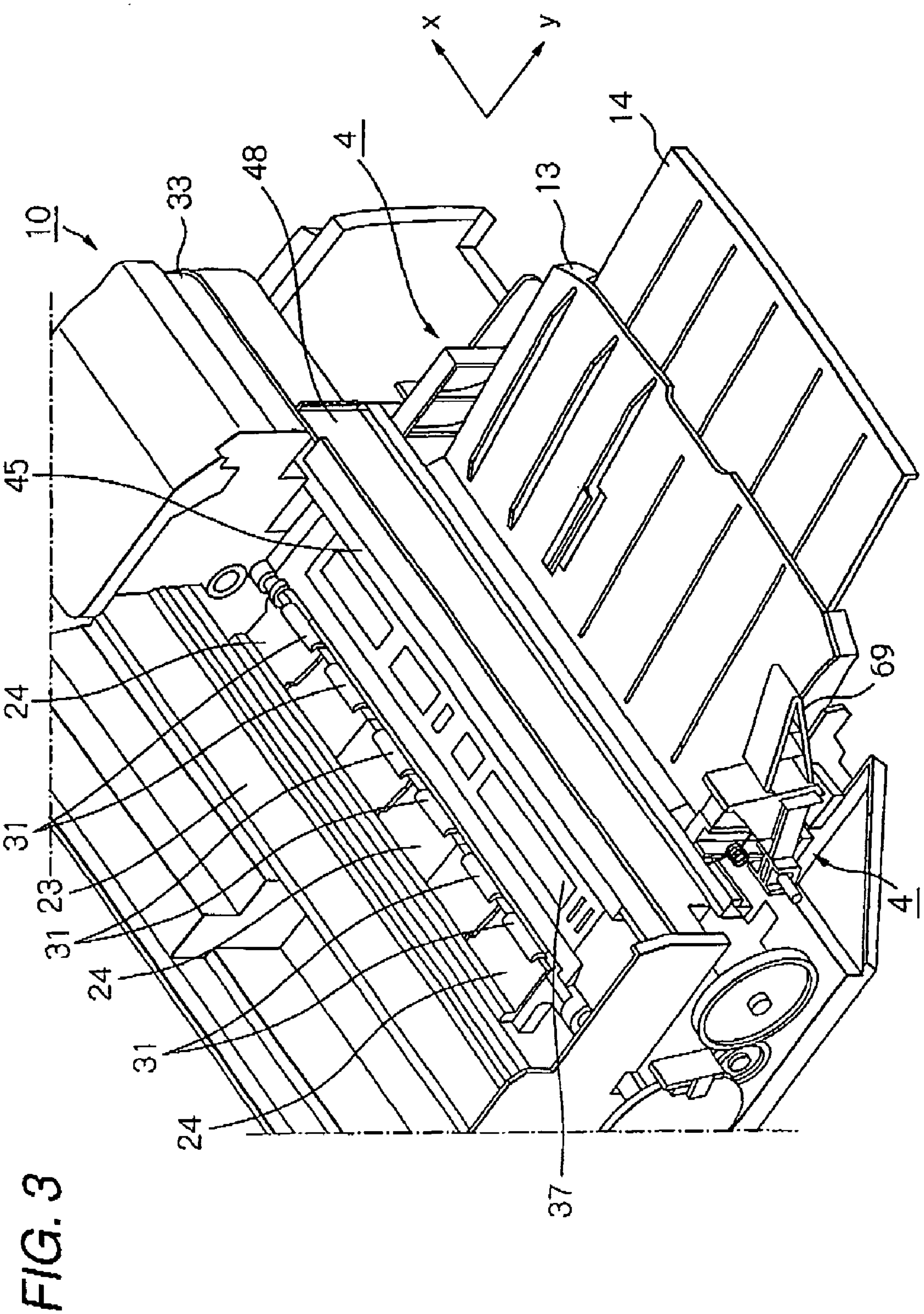
FIG. 3 is a perspective view of the main body of the printer section.
Figure 4:
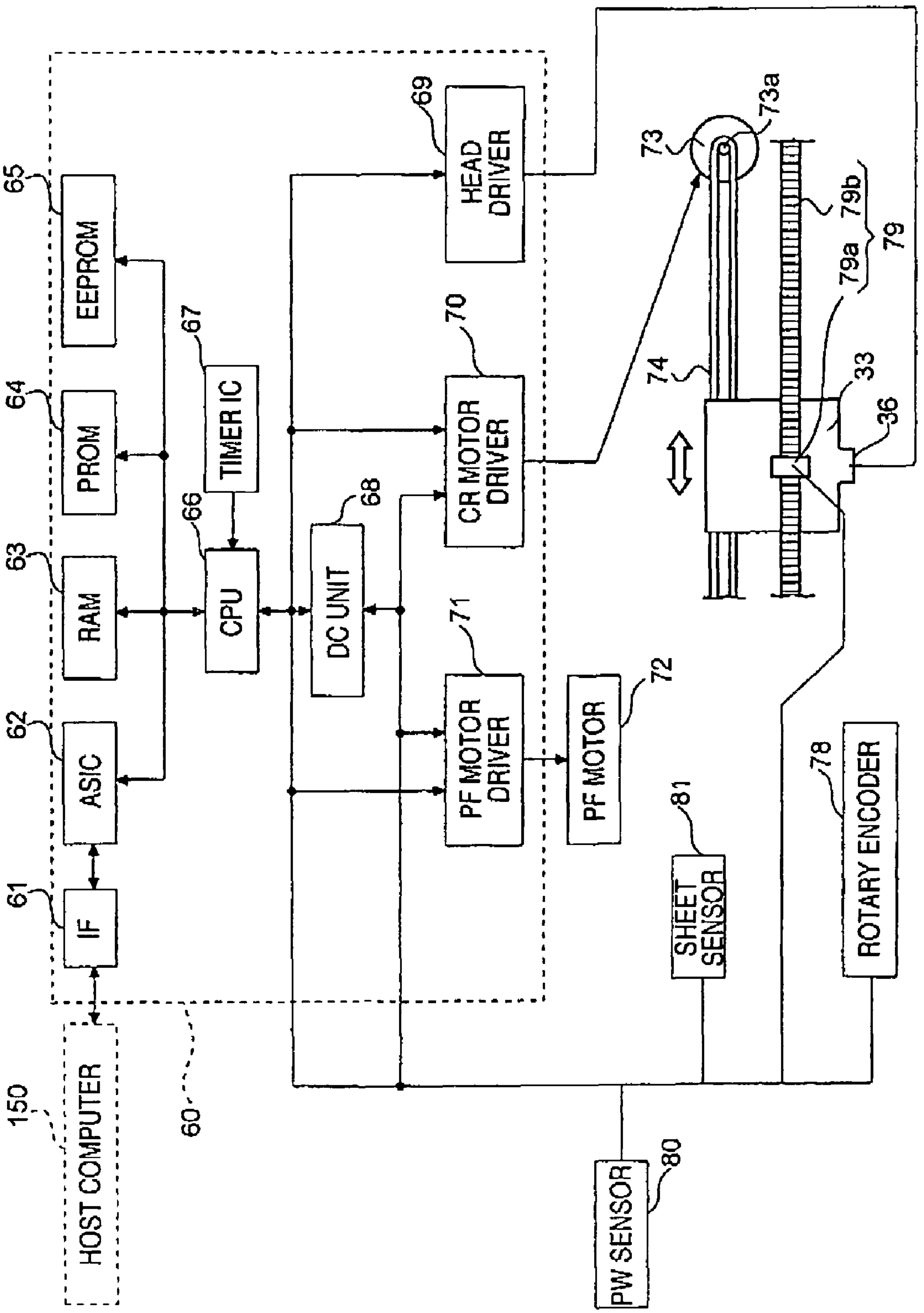
FIG. 4 is a block diagram of a drive control section.

First, by reference to FIGS. 1 through 4, the overall configuration of an inkjet printer (hereinafter called simply a "printers") 1, which serves as an example recording apparatus or an example liquid ejection apparatus according to the present invention, will be briefly described. FIG. 1 is an external perspective view of the printer 1; FIG. 2 is a side cross-sectional view of the printer 1; FIG. 3 is a perspective view of the main body of the printer section 10; and FIG. 4 is a block diagram centered on a drive control section 60. In the following descriptions, the rightward direction (the forward end of the printer) of FIG. 2 is referred to as a "downstream side" of a sheet transport path, and the leftward direction (the rearward end of the printer) of FIG. 2 is referred to as an "upstream side" of the sheet transport path. In the following drawings, a direction "x" denotes a main scanning direction, and a direction "y" denotes a sub-scanning direction As shown in FIG. 1, the printer 1 is a multifunction machine having a scanner function in addition to a printer function; and has a printer section 10 and a scanner unit 9 located above the printer section 10. The printer section 10 has the function of an inkjet printer for subjecting a recording sheet (a cutform sheet: hereinafter called "sheet P"), which is an example of a "recording medium" or a "medium to be subjected to ejection," to inkjet recording.

In FIG. 1, reference numeral 11 designates a cover body which closes an ejection port from which a recorded sheet P is ejected, and the cover body 11 opens the ejection port when pivoted through about 90° toward the user when the printer function is in use. A control panel 6 is provided forward of an upper portion of the printer section 10, A scanning function using the scanner unit 9, the recording function of the printer section 10, the function of recording a scanned image, and the like can be operated by way of the control panel 6.

The scanner unit 9 has a cover body 8 which pivots upwardly about an unillustrated pivot shaft (provided in a rear section of the printer) to thus be able to open and close. A glass mount face (not shown) on which a printed product or the like—an object of scanning—is to be placed is provided below the cover body 8. A scanning device (not shown) is provided below the glass mount face. The scanner unit 9 pivots upward about the unillustrated pivot shaft (provided in the rear section of the printer), whereby the upper portion of the printer section 10 is opened, to thus enable replacement of a member (e.g., an ink cartridge) in the recording section, such as a carriage, as well as maintenance.

The structure of a sheet transport path of the printer section 10 will be described hereinbelow by reference to FIG. 2. The printer section 10 has the functions of feeding a sheet P from a feeder 2 disposed in the rear section of the printer to transport rollers 29; of transporting the sheet P to a recording unit 32 by means of the transport rollers 29; and of ejecting the recorded sheet P to the outside of the printer by means of eject rollers 40. The printer section 10 has a linear transport path by way of which the transport rollers 29 can transport a tray (not shown)—which serves as a plate-like member and on which is set an optical disk serving as a recording medium—and a highly-ridge transport medium, such as thick cardboard and the like. Namely, the printer section 10 is configured so as to be able to subject a label face of an optical disk, cardboard, and the like, directly to inkjet recording.

The printer will be sequentially described first from the feeder 2. The feeder 2 includes a hopper 19, a feed roller 20, a retard roller 21, and a return lever 22.

The hopper 19 is made from a plate-like member and configured so as to be pivotable about an upper pivot (not shown). The hopper 19 pivots to thus bring the sheet P supported on the hopper 19 in a tilted manner into compressed contact with the feed roller 20, or to separate the sheet P from the feed roller 20. The feed roller 20 assumes a substantially D-shaped form as viewed from the side. The feed roller 20 is controlled so as to feed downstream the topmost sheet P which is brought into compressed contact with the feed roller 20 by means of an arc-shaped portion thereof. Subsequently, in the course of the sheet P being transported by the transport rollers 29, the feed roller 20 is controlled as illustrated in such a way that a flat portion of the feed roller 20 opposes the sheet P so as not to impose transport load.

The retard roller 21 is provided so as to be able to come into compressed contact with the arc-shaped portion of the feed roller 20. When overlap-feeding of sheets P does not arise and when only one sheet P is fed, the retard roller 21 follows to rotate while remaining in contact with the sheet P (in the clockwise direction of FIG. 2). When a plurality of sheets P are present between the feed roller 20 and the retard roller 21, a frictional coefficient existing between sheets is lower than a frictional coefficient existing between the sheet P and the retard roller 21, and hence the retard roller 21 does not rotate and comes to a standstill. Consequently, the sheets P subsequent to the topmost sheet P, which are about to be fed in an overlapping manner along with the topmost sheet P to be fed, fail to advance downstream from the retard roller 21, thereby preventing overlap-feeding of the sheets. The return lever 22 is provided in a pivotable manner, and acts so as to return the sheets P, which are about to be fed in an overlapping manner, to the hopper 19.

Interposed between the feeder 2 and the transport rollers 29 are a detection unit (not shown) for detecting passage of the sheet P and a guide roller 26 which determines the feeding attitude of the sheet P and prevents occurrence of contact of the sheet P with the feed roller 20, thereby lessening transport load.

The transport rollers 29 placed downstream of the feeder 2 include a transport drive roller 30 which is rotationally driven upon receipt of power from a paper feed (PF) motor 72 (FIG. 4); and a transport follower roller 31 which is rotated upon contacting the transport drive roller 30 in a compressed manner. The transport drive roller 30 has an adhesion layer which is formed by dispersing abrasion resistance particles substantially uniformly over an outer peripheral surface of a metal shaft extending in the widthwise direction of a sheet. An outer peripheral surface of the transport follower roller 31 is formed from a low friction material such as elastomer or the like, and is placed in numbers along the axial direction of the transport drive roller 30 as shown in FIG. 3.

In the present embodiment, two transport follower roller 31 are axially supported in a freely-rotatable manner at a downstream edge of a single upper paper guide 24. The upper paper guide 24 is provided in the number of three along the widthwise direction of the sheet as shown in FIG. 3. As a result of a shaft **24*a* being axially supported by a main frame 23, the upper paper guide 24 is provided so as to be pivotable about the shaft 24*a* when the sheet transport path is viewed from the side. Further, the transport follower rollers 31 are forced in a direction of coming into compressed contact with the transport drive roller 30, by means of coil springs 25**.

The sheet P transported by the feeder 2 to the transport rollers 29 or the tray (not shown), cardboard, or the like, inserted for the forward side of the printer is transported to the recording unit 32 in a downstream direction as a result of the transport drive roller 30 rotating while the sheet P, or the like, is nipped between the transport drive roller 30 and the transport follower roller 31. The transport drive roller 30 is rotationally driven by a sub-scan drive section 59. Specifically, the sub-scan drive section 59 feeds the sheet P or the like in a sub-scanning direction.

The recording unit 32 includes an inkjet recording head (hereinafter called simply as a "recording head") 36 and a lower paper guide 37 provided so as to oppose the recording head 36. The recording head 36 is disposed at the bottom of a carriage 33. Upon receipt of power from a carriage (CR) motor 73 (FIG. 4), the carriage 33 is driven so as to reciprocally travel in the main scanning direction while being guided by a carriage guide shaft 34 extending in the main scanning direction. In short, a main scan drive section 57 performs main scanning operation of the recording head 36 (and a PW sensor 80 which will be described later). Further, a head drive section 58 drives the recording head 36 during the course of main scanning operation, to thus subject the sheet P or the like to recording. The carriage 33 has independent ink cartridges of a plurality of colors (not shown) in a cover 35, and supplies ink from the ink cartridges to the recording head 36.

Ribs (not shown) are formed on a surface of the lower paper guide 37 opposing the recording head 36, wherein the lower paper guide 37 defines a distance between the sheet P and the recording head 36. Further, a concave section (not shown) into which ink is to be discarded is also formed in the same surface of the lower paper guide 37. Ink ejected to an area remote from the edge of the sheet P is discarded into the concave section, thereby effecting so-called frameless printing by means of which the sheet P is recorded to the edges without leaving margins.

Subsequently, disposed downstream of the recording head 36 are a guide roller 43, the eject rollers 40, a paper eject frame Assy 45, a stacker 13, a frame 48, a release unit 5, and other constituent elements unillustrated in FIG. 2 as well.

The guide roller 43 performs the function of preventing occurrence of lifting of the sheet P from the lower paper guide 37 to thus maintain a distance between the sheet P and the recording head 36 constant. The eject rollers 40 include an eject drive roller 41 which is driven upon receipt of power from the PF motor 72 (FIG. 4), and an eject follower roller 42 which is driven upon contacting the eject drive roller 41. In the present embodiment, the eject drive roller 41 is formed from a rubber roller and placed in numbers in the axial direction of a shaft member to be rotationally driven.

The eject follower roller 42 is formed from a spur roller having a plurality of teeth provided around an outer periphery of the roller. The eject drive roller 42 is provided in numbers on the sheet eject frame Assy 45 so as to pair up with the plurality of eject drive rollers 41. The sheet P recorded by the recording unit 32 is ejected to the stacker 13 as a result of the eject drive roller 41 rotating while the sheet P is nipped between the eject drive roller 41 and the eject follower roller 42.

The paper eject frame Assy 45 is displaceable (switchably) by way of the release unit 5 so as to assume a contact position where the eject follower roller 42 contacts the eject drive roller 41 and a separated position where the eject follower roller 42 is brought out of contact with the eject drive roller 41.

The stacker 13 for stacking ejected sheets P is provided downstream of the sheet eject frame Assy 45. This stacker 13 is provided such that a position switchover unit 4 (FIG. 3) can switch the stacker 13 between a first position where there is formed a linear transport path used for transporting the tray (not shown), cardboard, and the like, and a second position which is located below the first position and where sheets P can be stacked by the eject rollers 40. When the stacker 13 is located at the first position, the unillustrated tray, cardboard, and the like, is manually inserted (fed) from the forward to the rearward (upstream) of the printer while being supported by the stacker 13

The release unit 5 for displacing the sheet eject frame Assy 45 from the contact position to the separated position has a lever member 48 equipped with a press roller 49. When the unillustrated tray, cardboard, and the like, is inserted while the stacker 13 remains in the first position, the release unit 5 is pivoted so as to be raised upwardly. Consequently, the eject frame Assy 45 is displaced from the second position to the first position.

Subsequently, by reference to FIG. 4, the configuration of the drive control section 60 and that of surroundings thereof will be described, wherein the drive control section 60 implements a predetermined recording method by means of controlling respective drive sections of the main scan drive section 57, the head drive section 58, and the sub-scan drive section 59. The drive control section 60 is configured so as to be able to exchange data with a host computer 150 which transmits print information (print data) and other information to the printer 1. The drive control section 60 includes an IF 61 which is an interface with the host computer 150; an ASIC 62; RAM 63; PROM 64; EEPROM 65; a CPU 66; an timer IC 67; a DC unit 68; a paper feed (PF) motor driver 71; a carriage (CR) motor driver 70; and a head driver 69.

The CPU 66 performs arithmetic computation and other required computing operations which are intended for executing a control program of the printer 1. The timer IC 67 causes the CPU 66 to generate a periodic interrupt signal required for various types of processing operations. By reference to the print data transmitted from the host computer 150 via the IF 61, the ASIC 62 controls a print resolution, a drive waveform of the inkjet recording head 25, and the like. The RAM 63 is used as a work area for the ASIC 62 and the CPU 66 and as a primary storage area for other data. Various control programs (firmware) required to control the printer 1, data required for processing, and the like are stored in the PROM 64 and the EEPROM 65.

The DC unit 68 is a control circuit for controlling the speed of a DC motor (the CR motor 73 and the PF motor 72), and has a PID control section, an acceleration control section, a PWM control circuit, and the like, which are omitted from the drawings. The DC unit 68 performs various arithmetic operations for controlling the speed of the DC motor in response to a control command sent from the CPU 66 and signals output from the detection unit, such as a rotary encoder 78, a linear encoder 79, a paper sensor 81 for detecting passage of the recording sheet P, the PW sensor 80, and the like; and transmits a signal to the CR motor driver 70 and the PF motor driver 71.

Under control of the DC unit 68, the PF motor driver 71 controls driving of the PF motor 72. In the present embodiment, the PF motor 72 rotates a plurality of driving objects; namely, the previously-described feed roller 20, the transport drive roller 30, and the eject drive roller 41.

Under control of the DC unit 68, the CR motor driver 70 controls driving of the CR motor 73 to thereby cause the carriage 33 to reciprocally travel in the main scanning direction or to stop or hold. Under control of the CPU 66, the head driver 69 controls driving of the recording head 25 in accordance with the print data transmitted from the host computer 150.

The CPU 66 and the DC unit 68 are provided with a detection signal from the paper sensor 81 for detecting a leading edge and a trailing edge of the transported sheet P; a signal output from the rotary encoder 78 for detecting the amount of rotation, the rotating direction, and the rotational speed of the transport drive roller 30 (the PF motor 72); and a signal output from the linear encoder 79 for detecting the absolute position of the carriage 33 in the main scanning direction. The CPU 66 and the DC unit 68 are imparted with a signal output from the PW sensor 80 as well.

This PW sensor 80 is an optical sensor provided at a position in the carriage 33 opposing the sheet transport path (i.e., the bottom of the carriage 33); and includes a light-emitting portion (not shown) for emitting light toward the sheet transport path and a light-receiving portion (not shown) for receiving light reflected from the sheet transport path. The PW sensor 80 detects a change in reflectance arising in the sheet transport path. Thereby, the drive control section 60 can acquire edge positions (leading and trailing edges and right and left edges) of the sheet P by means of sensing operations of the PW sensor 80. Consequently, the drive control section 60 can acquire the width, length, and the like, of the sheet. By reference to the thus-detected edge position information, the position of a recording area (an ink ejection position) is determined, with the main scanning direction (an "x" direction) and the subscanning direction (a "y" diction) taken as a coordinate system.

The rotary encoder 78 has a disk-shaped scale (not shown) having a plurality of light passage portions formed along an outer periphery thereof; and a detection section (not shown) including a light-emitting portion for emitting light toward the light passage portions and a light-receiving portion for receiving the light having passed through the light passage portions. In association with rotation of the disk-shaped scale, the detection section outputs a rise signal and a fall signal, which are formed as a result of the light passing through the light passage portions. The drive control section 60 receives a signal output from such a rotary encoder 78 to thus detect the amount of rotation, the rotational speed, the rotating direction of the transport drive roller 30 and the like. As a result, feeding (sub-scan feeding) of a target sheet P can be controlled.

The linear encoder 79 has a code plate 79*b* elongated in the main scanning direction; and a detection section 79*a* having a light-emitting portion for emitting light toward a plurality of light passage portions formed in the code plate 79*b* in the main scanning direction and a light-receiving portion for receiving the light having passed through the light passage portions. The detection section 79*a* outputs a rise signal and a fall signal which are formed by the light having passed through the light passage portions. Upon receipt of a signal output from such a detection section 79*a*, the drive control section 60 detects the position of the carriage 33 (i.e., the PW sensor 80) in the main scanning direction.

The PF motor driver 71 and the PF motor 72 constitute the sub-scanning drive section 59 shown in FIG. 2. The CR motor driver 70 and the CR motor 73 constitute the main scanning direction drive section 57. The head driver 69 constitutes the head drive section 58.

The overall configuration of the printer 1 is as described above.

First Embodiment

Figure 5:
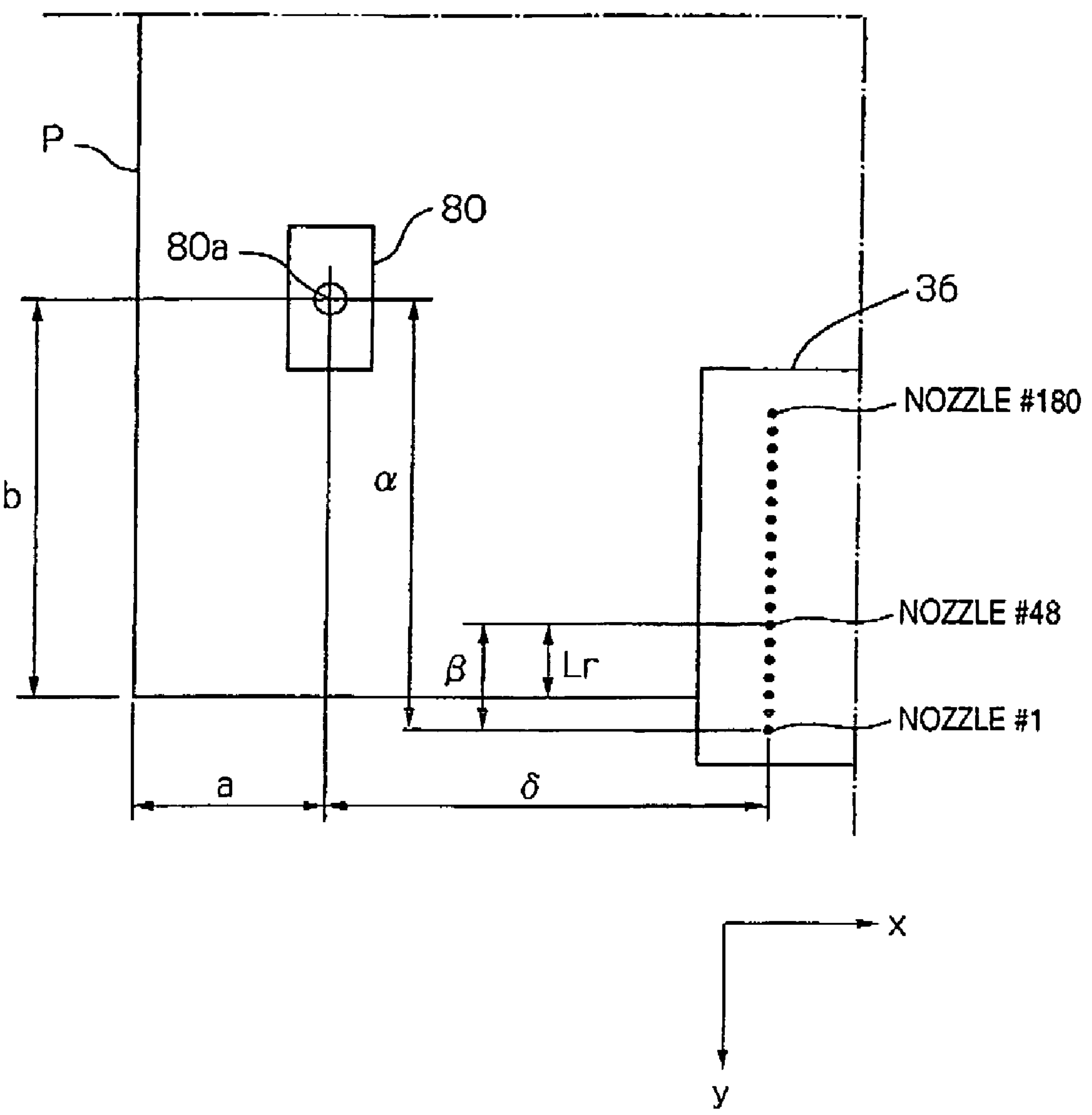
FIG. 5 is a plan view showing a positional relationship among a leading edge of the sheet, a recording head, and a PW sensor.
Figure 6:
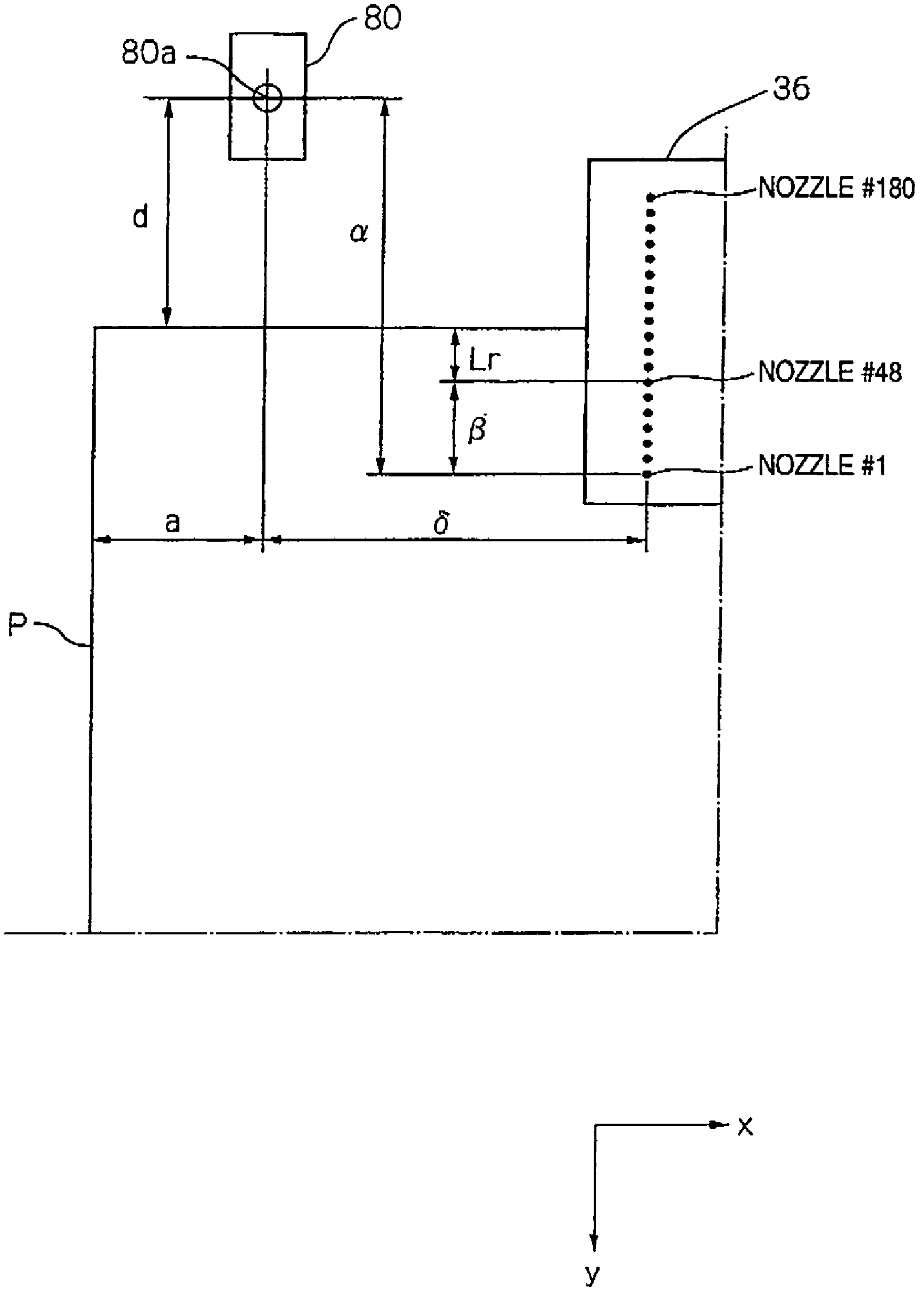
FIG. 6 is a plan view showing a positional relationship among a trailing edge of the sheet, the recording head, and the PW sensor.
Figure 7:
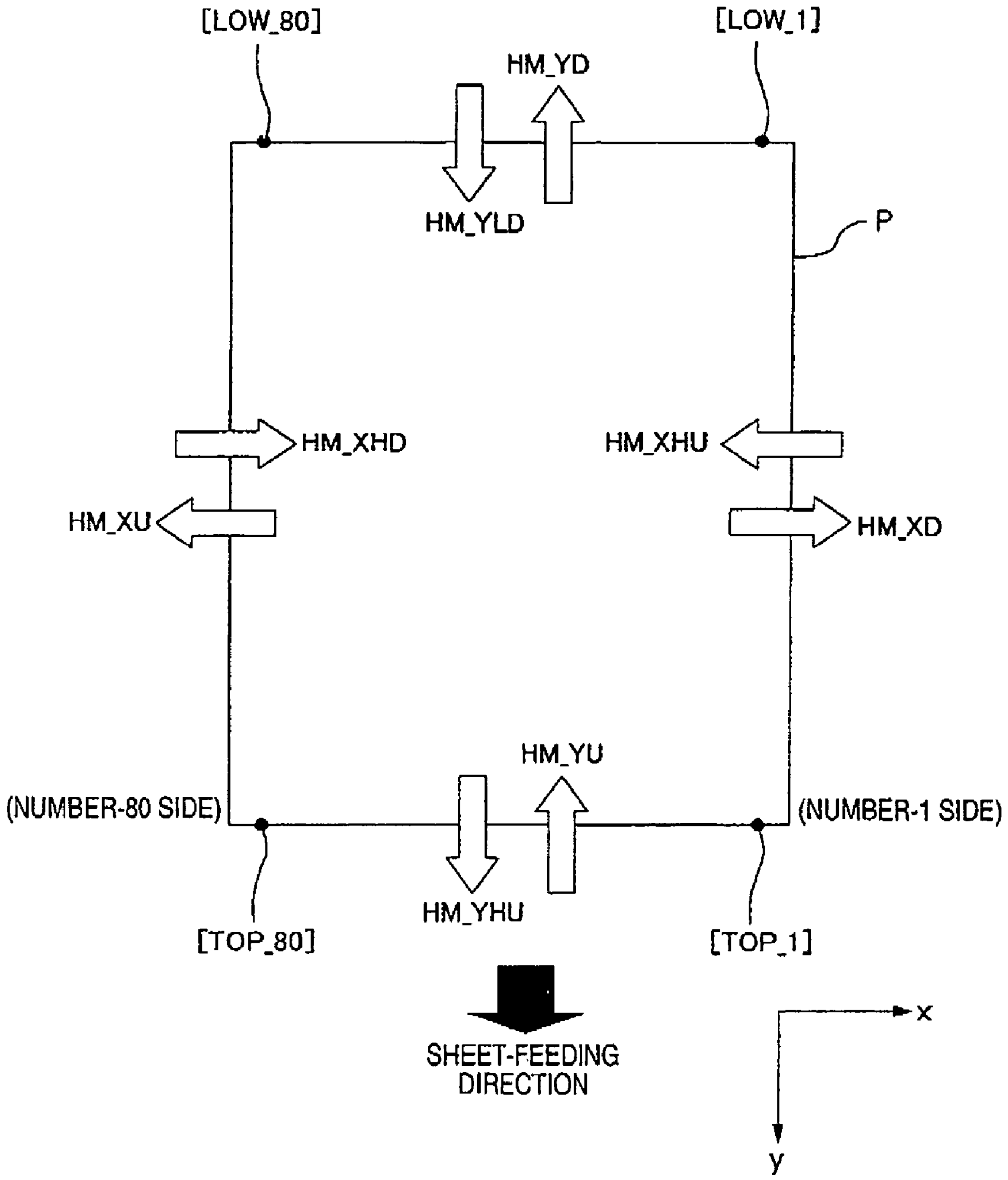
FIG. 7 is a view showing a direction in which the edge of the sheet is sensed by the PW sensor.
Figure 8:
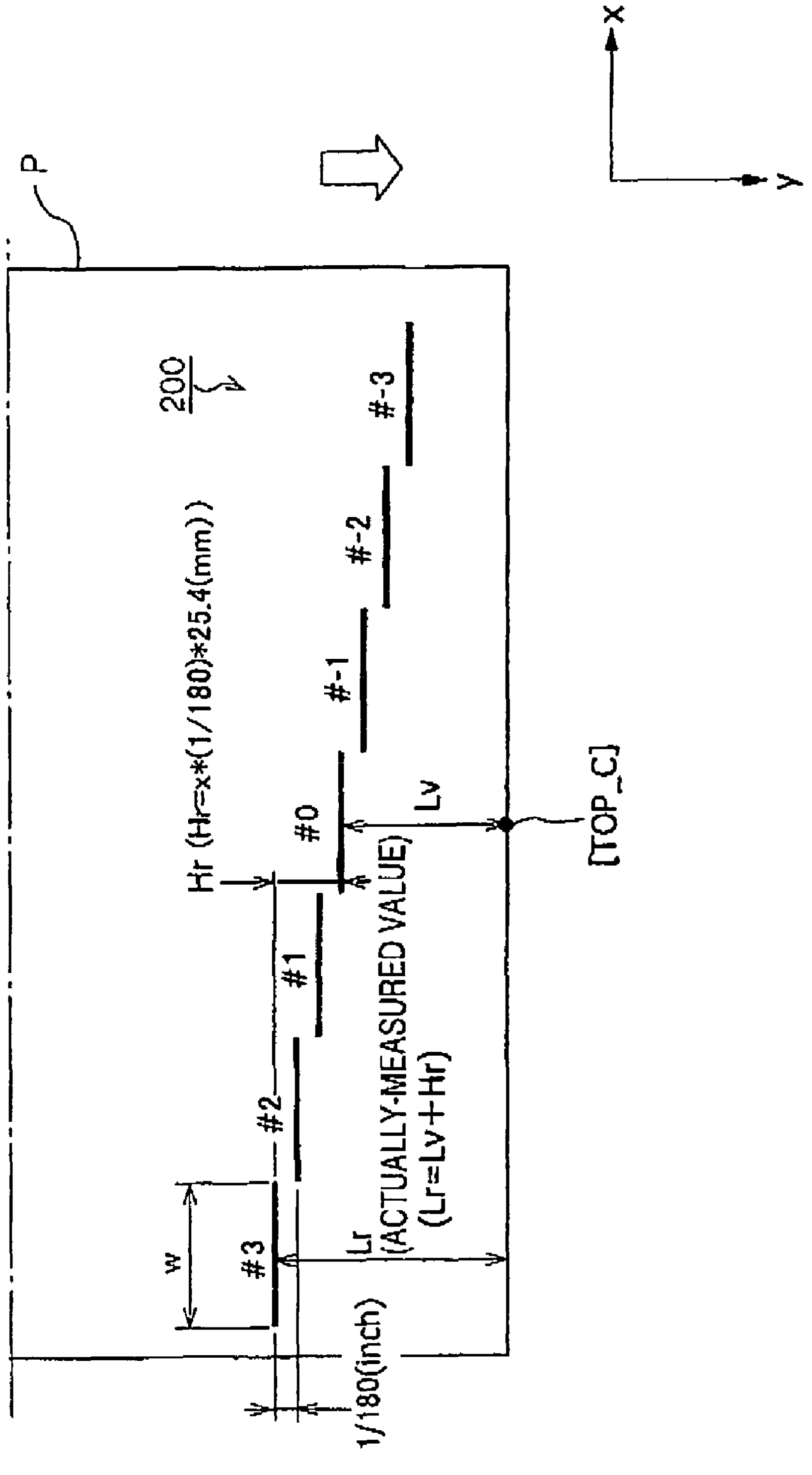
FIG. 8 is a view showing that a correction value obtainment pattern is formed along the leading edge of the sheet.
Figure 9:
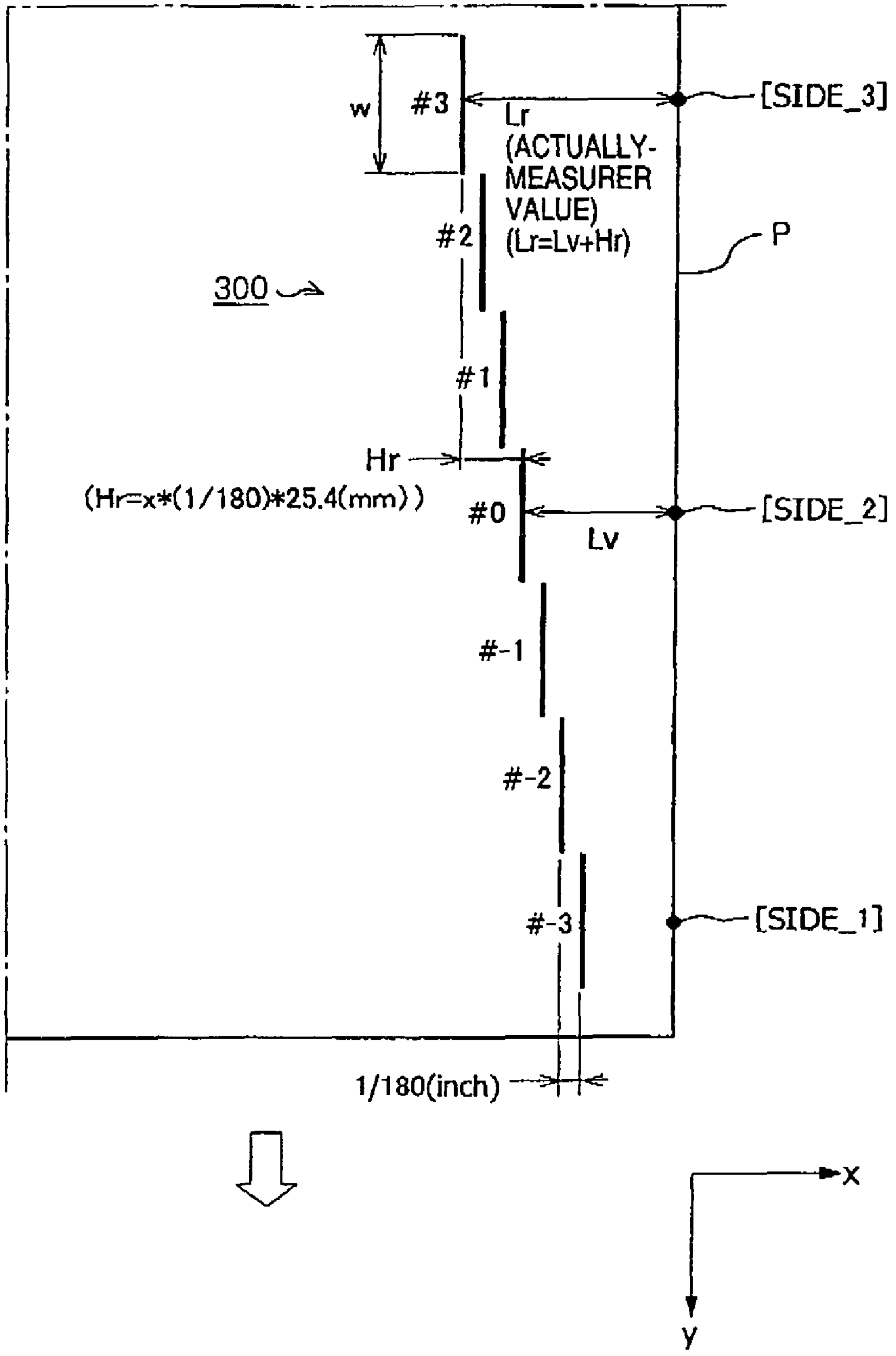
FIG. 9 is a view showing that the correction value obtainment pattern is formed along a side edge of the sheet.
Figure 10:
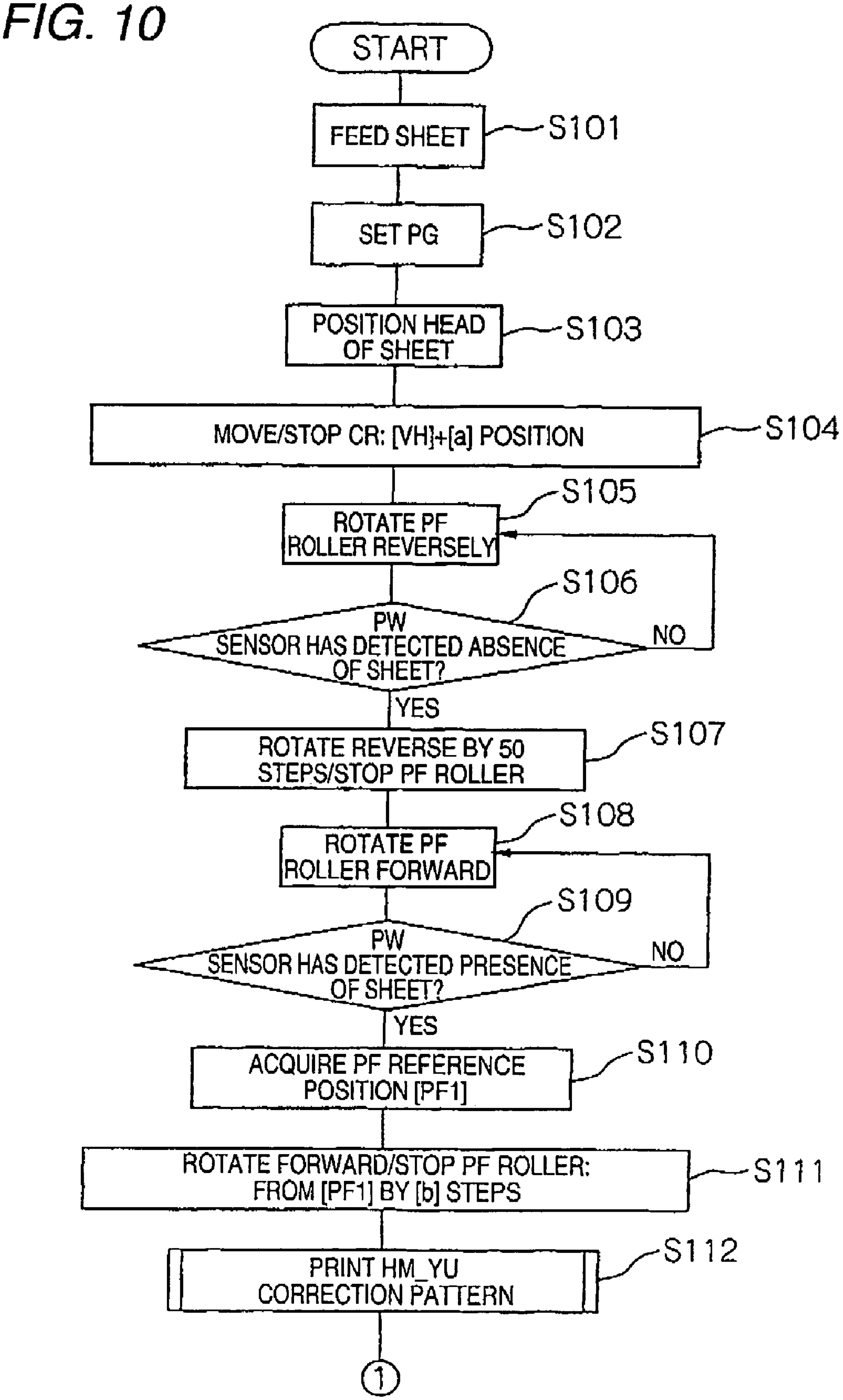
FIG. 10 is a flowchart showing procedures employed at the time of formation of the correction value obtainment pattern.
Figure 11:
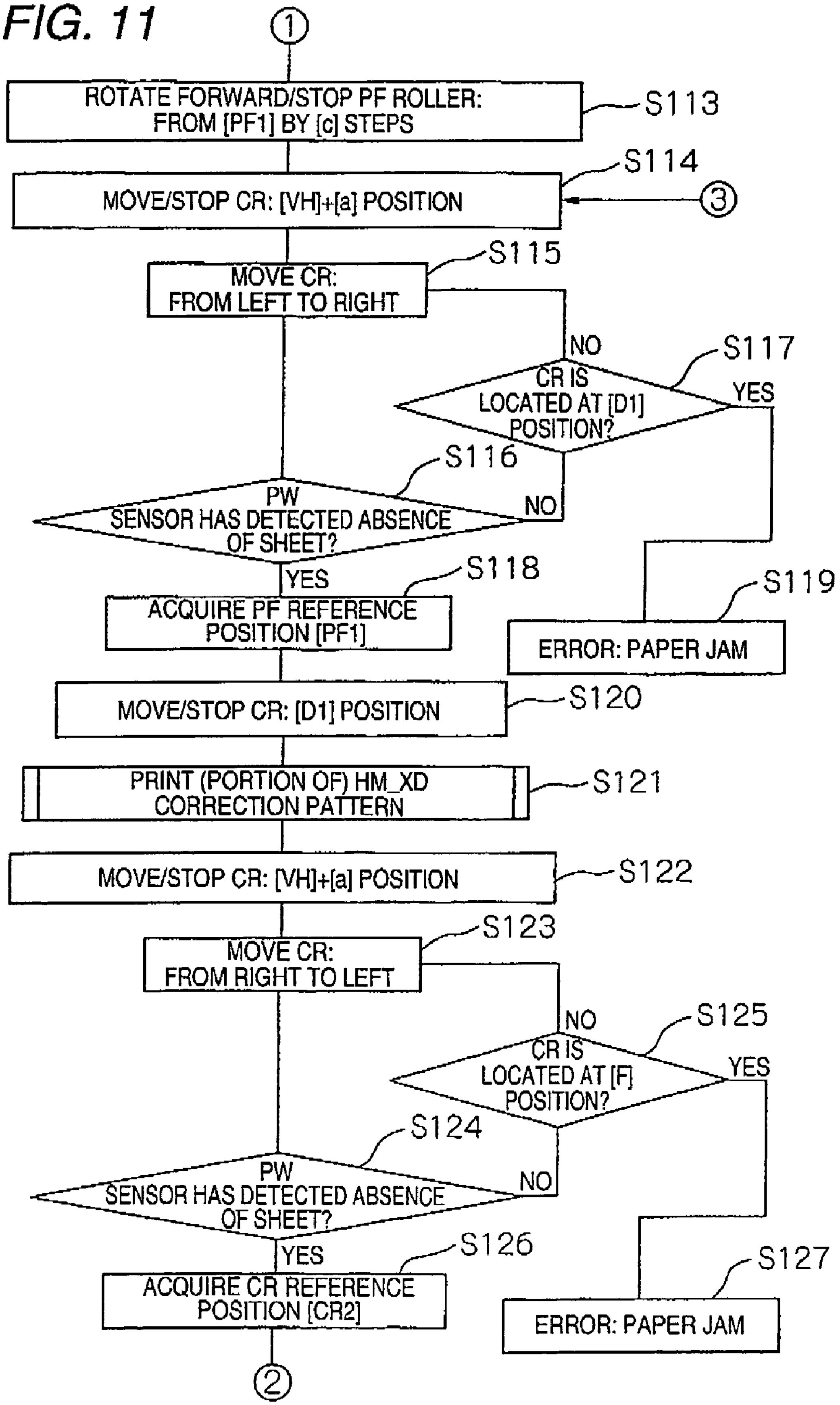
FIG. 11 is a flowchart showing procedures employed at the time of formation of the correction value obtainment pattern.
Figure 12:
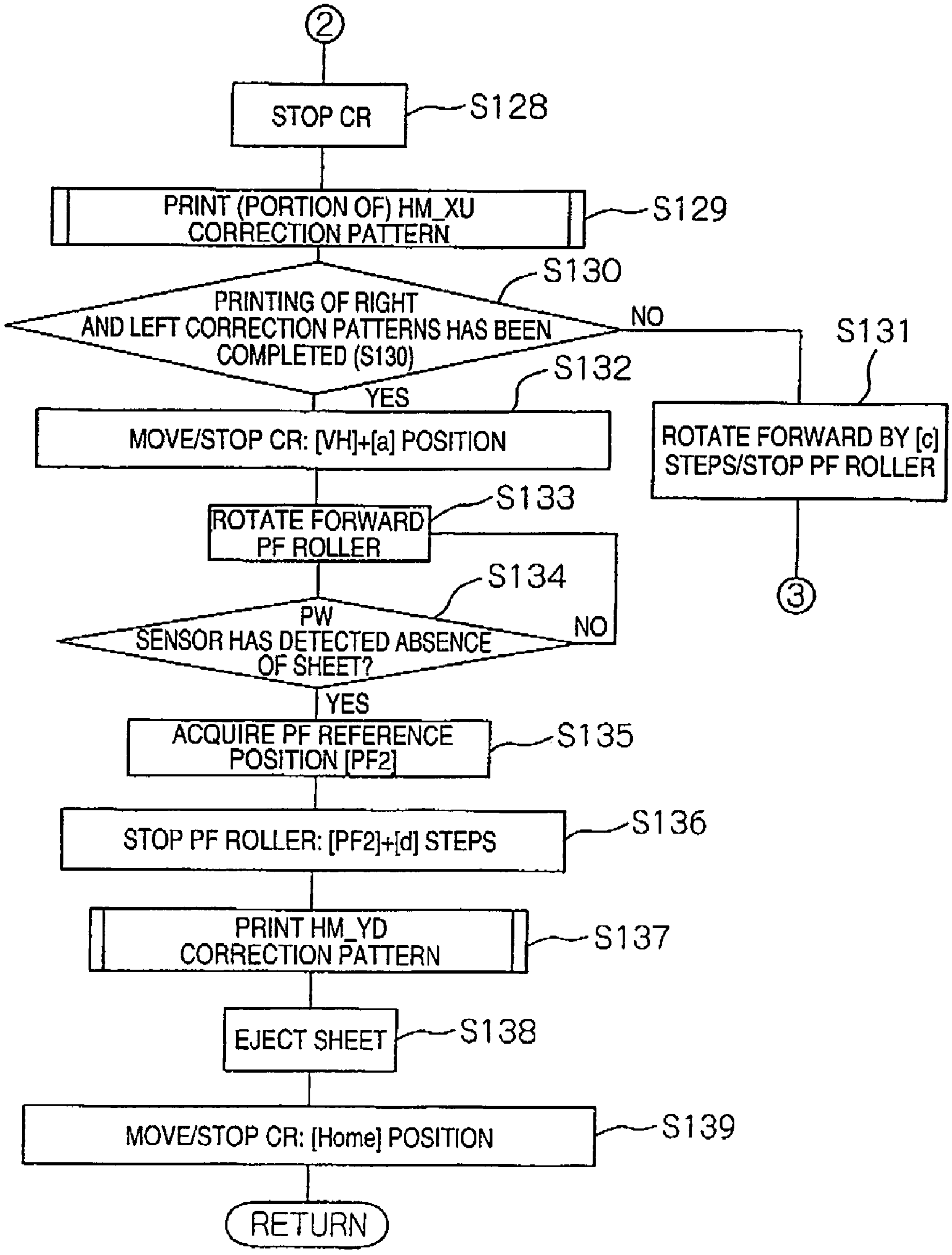
FIG. 12 is a flowchart showing procedures employed at the time of formation of the correction value obtainment pattern.

Subsequently, by reference to FIGS. 5 to 12, a first embodiment of the present invention will be described. FIG. 5 is a plan view (a view of the carriage 33 when viewed from above) showing a positional relationship among the leading edge of the sheet P, the recording head 36, and the PW sensor 80. FIG. 6 is a plan view (a view of the carriage 33 when viewed from above) showing a positional relationship among the trailing edge of the sheet P, the recording head 36, and the PW sensor 80. FIG. 7 is a view showing a direction in which the edge of the sheet is sensed by the PW sensor 80. FIG. 8 is a view showing that a correction value obtainment pattern is formed along the leading edge of the sheet. FIG. 9 is a view showing that the correction value obtainment pattern is formed along a side edge of the sheet. FIGS. 10 through 12 are flowcharts showing procedures employed at the time of formation of the correction value obtainment pattern.

In FIGS. 5 and 6, reference symbol $\alpha$ denotes a distance in direction "y" between a nozzle #1 of an arbitrary row of nozzles (e.g., a row of black nozzles) in the recording head 36 and an optical center 80*a* of the PW sensor 80. Reference symbol $\delta$ denotes a distance in the direction "x" between the above-mentioned row of nozzles and the optical center 80*a* of the PW sensor. Reference symbol $\beta$ denotes a distance in direction "y" between the nozzle #1 and a nozzle #48; and symbol Lr denotes a distance in direction "y" between the leading or trailing edge of the sheet P and the nozzle #48. Reference symbol "a" denotes a distance in direction "x" between the side edge of the sheet P and the optical center 80*a*; and "b" and "d" denote distances in direction "y" between the leading or trailing edge of the sheet P and the optical center 80*a*.

During assembly of a printer, an error arises in the positional relationship between the PW sensor 80 and the recording head 36. When an error has arisen in the distances $\alpha$ and $\delta$, this error is responsible for an error which will arise when the PW sensor 80 detects the edge position of the sheet P. Further, the PW sensor 80 has individual differences, and the detection accuracy of the PW sensor 80 is not always constant, which also induces a detection error at the time of detection of the edge of the sheet. In the following descriptions, the displacement of the positional relationship between the PW sensor 80 and the recording head 36; an error in the detection operation of the PW sensor 80; or a difference arising for reasons of these errors between the location ascertained as the edge of the sheet P by the drive control section 60 and the actual position of the edge are taken as "errors in detection of the PW sensor 80."

According, in FIG. 5 or 6, the nozzle #48 is placed at a position spaced over a distance Lr and in direction "y" from the position which has been ascertained as the leading or trailing edge of the sheet P by the drive control section 60. A line (hereinafter called "reference line") parallel to the main scanning direction is formed by use of the nozzle #48. In this case, when an error arises in sensing performed by the PW sensor 80 (the error is hereinafter called a "detection error"), actual measurement of the distance between the leading or trailing edge of the sheet P and the reference line performed by an operator shows that an error is actually added to the distance Lr.

Accordingly, the drive control section 60 retains the error as the absolute value of a correction value Hp used for correcting the detection error of the PW sensor 80. When recording is actually performed, the error is added to or subtracted from the ascertained edge position by use of the PW sensor 80, whereby the detection error of the PW sensor 80 is corrected. Thus, a correct edge position can be grasped, and ink can be ejected to an accurate position.

In many cases, an error arising in detection of the PW sensor 80 when the PW sensor 80 moves from the position (a sheet-presence side) opposing the sheet P to a location (a sheet-absence side) where the sheet P is not present differs from an error arising in detection of the PW sensor 80 when the PW sensor 80 moves from the sheet-absence side to the sheet-presence side. Accordingly, a detection error arising when sensing is effected in a direction designated by reference symbol HM_YU (sheet absence to sheet presence) in FIG. 7 differs from a detection error arising when sensing is effected in a direction designated by reference symbol HM_YD (sheet presence to sheet absence) in FIG. 7.

FIG. 7 shows a relationship between the sheet P and the sheet feeding direction. A lower portion of the drawing shows the direction in which the sheet P is to be fed (a direction +y) and the leading edge of the sheet P. In contrast, an upper portion of the drawing (a direction −y) shows the trailing edge of the sheet P. A rightward direction of the drawing (a direction +x) shows a number-1 side (Home Position) of the sheet P, and a leftward direction of the same (a direction −x) shows a number-80 side of the sheet P. Outlined arrows in the drawing show an example sensing direction of the PW sensor 80. Reference numerals [TOP_1], [TOP_80], [LOW_1], and [LOW_80] will be used in a second embodiment which will be described later.

Accordingly, the detection error arising when the edge position of the sheet P is detected by use of the PW sensor 80, or the correction value Hp, is desirably acquired in each of the sensing directions by means of performing sensing operation in each of the sensing directions shown in FIG. 7, and the thus-acquired Hp correction is desirably held. However, for instance, sensing effected in the direction HM_YU direction in FIG. 7 and sensing effected in the direction HM_YLD direction in FIG. 7 are oriented in the same direction "y" and from the sheet-absence side toward the sheet-presence side, as well. Therefore, the correction value Hp may be acquired by means of effecting sensing in any one of the directions HM_YU and HM_YLD.

Adding or subtracting the obtained correction value Hp (the absolute value) to or from the edge position acquired by use of the PW sensor 80 (a coordinate in direction "x," a coordinate in direction "y") can be determined if an error (the detection error) has arisen in the direction of sheet presence or the direction of sheet absence when the operator has actually measured the distance between the edge of the sheet P and the reference line.

Next, FIG. 8 shows an example correction value obtainment pattern formed on the sheet P for the purpose of obtaining the correction value Hp for the PW sensor 80. In this embodiment, a correction value obtainment pattern 200 is formed along the leading edge of the sheet P. In FIG. 8, reference symbol [TOP_C] denotes the position of a leading edge to be detected by means of sensing performed by the PW sensor 80 (e.g., the direction indicated by HM_YU in FIG. 7). The drive control section 60 forms the correction value obtainment pattern 200 by use of the nozzle #48 and nozzles before and after that nozzle shown in FIG. 5, wherein the correction value obtainment pattern 200 includes the reference line (#0) parallel to the direction "x" at the position spaced over the distance Lr along the direction "y" from the acquired position of the leading edge, and lines parallel to the direction "x" are formed stepwise (as a step shape) so as to be spaced at a given interval (e.g., 1/180 inches) along the direction "y."

In the present embodiment, nozzles in the recording head 36 shown in FIGS. 5 and 6 are formed into a row at a pitch of 1/180 inches. Consequently, as shown in FIG. 8, the correction value obtainment pattern 200 is formed at an interval equal to the nozzle pitch, whereby the correction value obtainment pattern 200 shown in FIG. 8 can be formed by means of a single main scanning operation of the carriage 33 without performing sub-scanning operations. As a result, the correction value obtainment pattern 200 can be accurately recorded without involvement of occurrence of a transport error, which would otherwise be caused when the sheet P is fed in the sub-scanning direction.

Numbers (#−3 to #3) used for identifying the respective lines in the correction value obtainment pattern 200 are recorded in the vicinity of the respective lines in FIG. 8. In the embodiment shown in FIG. 8, on the assumption that a line satisfying the distance Lr is determined to be, e.g., line #3, through actual measurement, the detection error of the PW sensor 80 is denoted by reference symbol Hr. Specifically, provided that an actual distance between the leading edge of the sheet and the reference line #0 is Lv, Lr=Lv+Hr is achieved.

Since the lines are formed at a pitch of 1/180 inches, Hr=x·(1/180)·25.4 (mm) is defined on the assumption that a specified line number is "x" ("3" in the above example).

For instance, the operator inputs the number "x" as information about the specified line by utilization of the host computer 150 (FIG. 4), whereby the number "x" is transmitted to the drive control section 60. The drive control section 60 having received the number "x" acquires the detection error Hr by means of the above formula; and stores the detection error in a storage unit (e.g., EEPROM 65 shown in FIG. 4) as the correction value Hp of the PW sensor 80. After that, when the position of the leading or trailing edge of the sheet P has been detected, the correction value Hp is added to the detected edge position (coordinates in direction "y"), thereby correcting the detection error.

FIG. 9 shows an example where a correction value obtainment pattern 300 is formed along the side edge on the number-1 side of the sheet P. In contrast with the example shown in FIG. 8, lines parallel to the direction "y" form a stepwise pattern. In contrast with the example of FIG. 8, the sensing operation of the PW sensor 80, operation for recording the correction value obtainment pattern performed by the recording head 36, and sheet-feeding operation are performed alternately. In this case, even when an error has arisen in the transport of the sheet P, the respective lines are formed in parallel to the direction "y." Hence, the error does not affect the detection error Hr to be determined. In FIG. 9, reference symbol [SIDE_n] denotes the position of the edge detected by the PW sensor 80.

Since the sensing operation of the PW sensor 80, operation for recording the correction value obtainment pattern performed by the recording head 36, and sheet-feeding operation are performed alternately, even when the side edge is inclined with respect to the line parallel to the direction "y" as in the case where skew has arisen in the sheet P or where the sheet P is not formed into an exact square shape (rectangular form), the inclination does not affect the detection error Hr, and hence the detection error Hr of the PW sensor 80 can be determined.

Procedures for forming the correction value obtainment pattern along the leading and trailing edges and the right and left side edges of the sheet P will be described by reference to FIGS. 10 through 12.

First, the sheet P is fed (step S101), and a PG (platen gap: an interval between the recording head 36 and the platen 37) suitable for the fed sheet P is set (step S102). In order to prevent deterioration of the accuracy of actual measurement, which would otherwise be caused by ink blotches when the distance between the edge of the sheet and the reference line has been actually measured, a custom-designed sheet having a coating layer is preferably used for the sheet P. In step S102, PG suitable for the custom-designed sheet is set.

The head of the sheet P is positioned (step S103). As a result of positioning the head, nozzle #90 is positioned at a location which is spaced a predetermined distance (e.g., 5 mm or thereabouts) in the direction "y" from the leading edge of the sheet. Next, the carriage (hereinafter abbreviated as "CR") 33 is located at a predetermined position ([VH]+[a] position) (step S104). Thereby, the optical center 80*a* of the PW sensor 80 is located at a position (on the sheet-presence side) which is inwardly spaced about 5 mm from the side edge on the number-1 side of the sheet along the direction "x."

In this state, the optical center 80*a* of the PW sensor 80 is situated at a position which is inwardly spaced (on the sheet-presence side) a predetermined distance from the leading edge of the sheet along the direction "y." The PW sensor 80 detects absence of a sheet (step S106) while the transport drive roller (hereinafter called a "PF roller") 30 is rotated in reverse (step S105). Specifically, this sensing corresponds to sensing denoted by HM_YHU of FIG. 7

When the presence of the leading edge of the sheet P has been ascertained by means of the above operations, reverse rotation of the PF roller 30 is stopped after having been continued to a certain extent (e.g., 50 steps) (step S107). Subsequently, the PW sensor 80 detects presence of a sheet (step S109) while the PF roller 30 is being rotated forward (step S108). Specifically, this sensing corresponds to sensing denoted by HM_YU of FIG. 7.

A location where presence of a sheet has been detected is acquired as coordinates of the leading edge of the sheet P in the direction "y" (PF reference position [PF1]) (step S110). After having been rotated forward by a predetermined distance (by [b] steps from [PF1]), the PF roller 30 is stopped (step S111).

Thereby, the drive control section 60 places nozzle #48 at a position which is spaced a distance Lr (mm) from the position of the leading edge of the sheet ([PF1]) acquired by means of sensing operation involving use of the PW sensor 80. Accordingly, so far as the reference line is formed by use of nozzle #48 and the detection error Hr of the PW sensor 80 is zero, an actual measurement value Lr (mm) is obtained when the distance from the leading edge of the sheet to the reference line has actually been measured. When the detection error Hr is not zero, the actual measurement value corresponds to a value [Lv (mm)] which is the sum of the actually-measured value Lr (mm) and the detection error Hr (mm).

The HM_YU correction pattern is printed along the leading edge of the sheet (step S112) This correction pattern is the correction value obtainment pattern 200 shown in FIG. 8, and the reference line (#0) is formed by use of nozzle #48.

Subsequently, after having been rotated forward over a predetermined distance (by [c] steps from [PF1]), the PF roller 30 is stopped (step S113). Thereby, the optical center 80*a* of the PW sensor 80 is located at a position (on the sheet-presence side) which is spaced inwardly a predetermined distance from the leading edge of the sheet in direction "y." Next, after the CR 33 has been placed at the predetermined position ([VH]+[a] position) (step S114), the PW sensor 80 detects absence of a sheet (step S116) while the CR 33 is being moved from left to right (from the number-80 side to the number-1 side) (step S115). Specifically, this sensing corresponds to sensing denoted by HM_XD shown in FIG. 7. At this time, when the CR 33 has reached the predetermined position ([D1] position) (when an affirmative branch has been selected in step S117), subsequent processing is aborted as occurrence of a paper jam error (step S119).

A location where sheet absence has been detected is acquired as an edge position on the number-1 side of the sheet P (CR reference position [CR1]) (step S118). After the CR33 has been placed at a predetermined position ([D1] position) (step S120), a portion of the HM_XD correction pattern is printed while the CR 33 is being moved from right to left (from the number-1 side to the number-80 side) (step S121). The correction pattern printed in this step is a portion of the correction value obtainment pattern 300 shown in FIG. 9 (corresponding to, e.g., three lines).

Subsequently, after the CR 33 has been placed at a predetermined position ([VH]+[a] position) (step S122), the PW sensor 80 detects absence of a sheet (step S124) while the CR 33 is being moved from right to left (from the number-1 side to the number-80 side) (step S123). Specifically, this sensing corresponds to sensing denoted by HM_XU shown in FIG. 7. At this time, when the CR 33 has reached the predetermined position ([F] position) (when an affirmative branch has been selected in step S125), subsequent processing is aborted as occurrence of a paper jam (step S127).

A location where absence of a sheet has been detected is acquired as the edge position on the number-80 side of the sheet P (CR reference position [CR2]) (step S126), and the CR 33 is stopped after having been moved slightly horizontally (step S128). A portion of the HM_XU correction pattern is printed (step S129) while the CR 33 is being moved from left to right (from the number-80 side to the number-1 side) (step S129). The correction pattern printed in this step is a portion of a correction value obtainment pattern which is a mirror image of the correction value obtainment pattern 300 shown in FIG. 9 (corresponding to; e.g., three lines).

Next, a determination is made to whether or not printing of all the right and left correction value obtainment patterns has been completed (step S130). When printing has not been completed (when a negative branch has been selected), the PF roller 30 is rotated forward over a predetermined distance ([c] steps) (step S131). Subsequently, the sheet is fed for further printing the next right and left correction patterns, and processing returns to step S114. Subsequently, these operations are repeated. When printing of all the right and left correction value obtainment patterns has been completed (an affirmative branch has been selected), the CR 33 is placed at a predetermined position ([VH]+(a) position) (step S132). Subsequently, the PW sensor 80 detects absence of a sheet (step S134) while the PF roller 30 is being rotated forward (step S133). Specifically, this sensing corresponds to the sensing designated by HM_YD of FIG. 7.

A location where absence of the sheet has been detected is acquired as the position of the trailing edge of the sheet P (PF reference position [PF2]) (step S135). After having been rotated over a predetermined distance (by [d] steps from [PF2] position), the PF roller 30 is stopped (step S136). By means of forward rotation of the PF roller 30 by [PF1]+[d] steps, nozzle #48 is located at a position (on the sheet-presence side) which is spaced inwardly the distance Lr (mm) from the trailing edge of the sheet P in direction "y."

In short, the drive control section 60 places #48 nozzle at the position which is spaced the distance Lr (mm) from the position of the trailing edge ([PF2]) of the sheet detected by means of sensing involving use of the PW sensor 80. Accordingly, so far as the reference line is formed by use of nozzle #48 and the detection error Hr of the PW sensor 80 is zero, an actual measurement value Lr (mm) is obtained when the distance from the trailing edge of the sheet to the reference line has actually been measured. When the detection error Hr is not zero, the actual measurement value corresponds to the sum of the actually-measured value Lr (mm) and the detection error Hr (mm).

The HM_YD correction pattern is printed along the trailing edge of the sheet (step S137). This correction pattern is the correction obtainment pattern 200 shown in FIG. 8, and the reference line (#0) is formed by use of nozzle #48.

Subsequently, the sheet P is ejected (step S138), and the CR 33 is returned to the [Home] position (step S139), whereby processing returns to a higher-level routine.

Through the above operations, the correction value obtainment pattern is formed along the leading and trailing edges and the right and left edges of the sheet. By means of actual measurement, the operator specifies a line at a position spaced the distance Lr (mm) from each edge. The number (#-3 to #3) is input to the host computer 150 (FIG. 4). Upon receipt of the thus-input line number "x," the drive control section 60 determines the detection error Hr in each of the sensing directions (HM_YU, HM_XD, HM_XU, HM_YD) by means of $Hr=x\cdot(1/180)\cdot 25.4$ (mm), and the value is written as the correction value Hp in EEPROM 65 (FIG. 4).

After that, when sensing is effected in each of the sensing directions, a corresponding correction value Hp is added to the detected edge position, whereby an accurate edge position is acquired.

Second Embodiment

Figure 13:
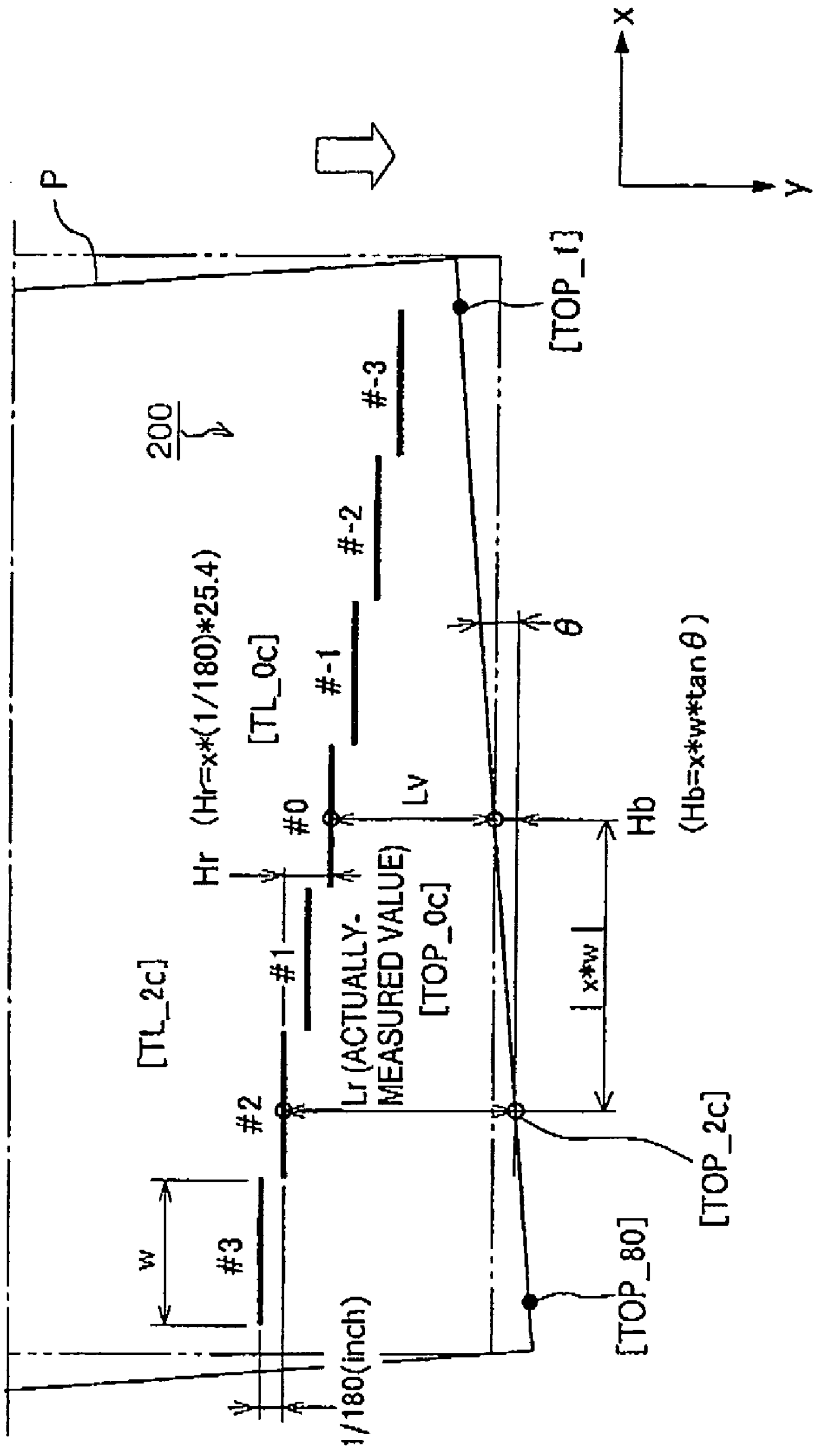
FIG. 13 is a view showing that a correction value obtainment pattern is formed along the leading edge of the sheet.
Figure 14:
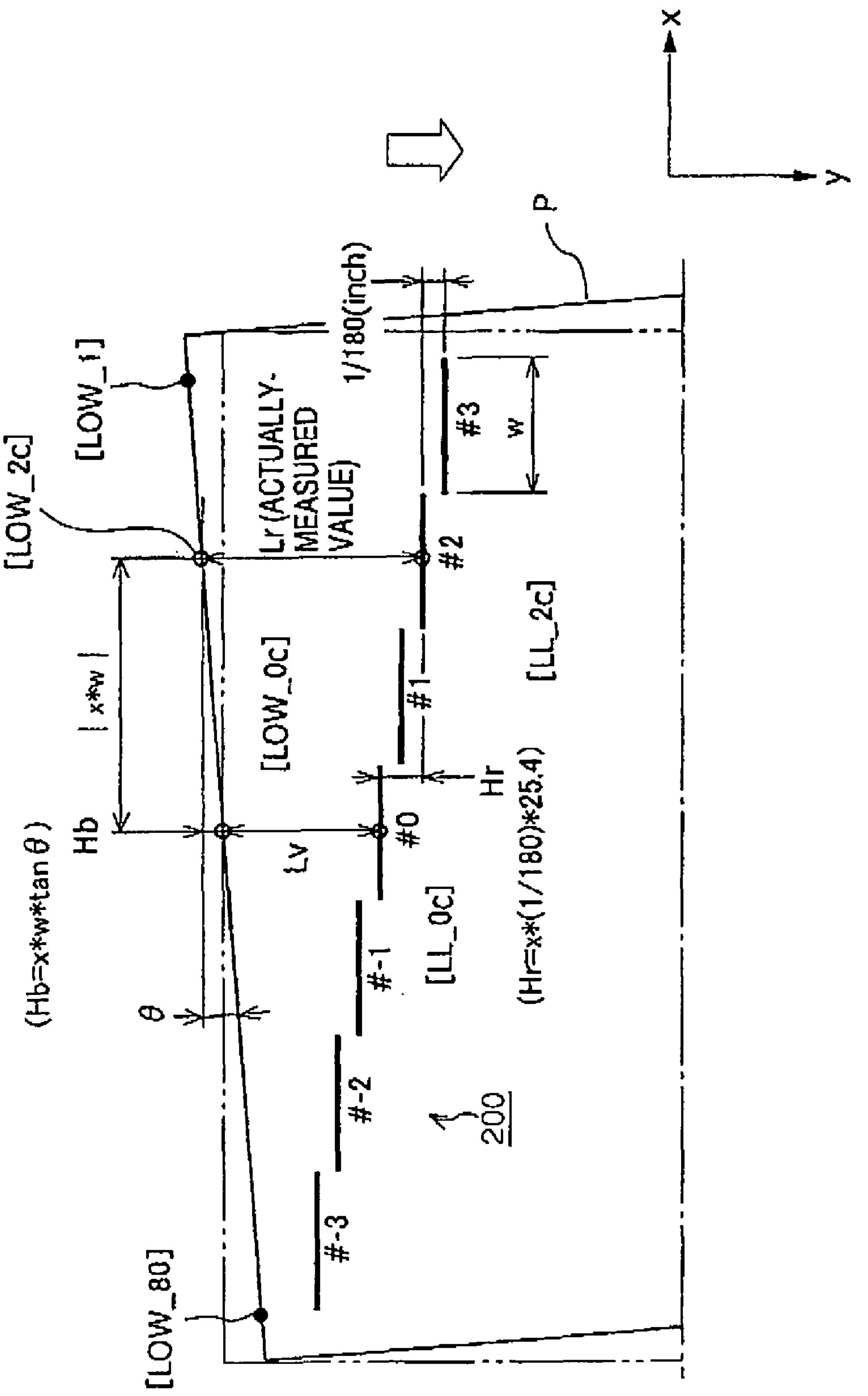
FIG. 14 is a view showing that the correction value obtainment pattern is formed along the trailing edge of the sheet.
Figure 15:
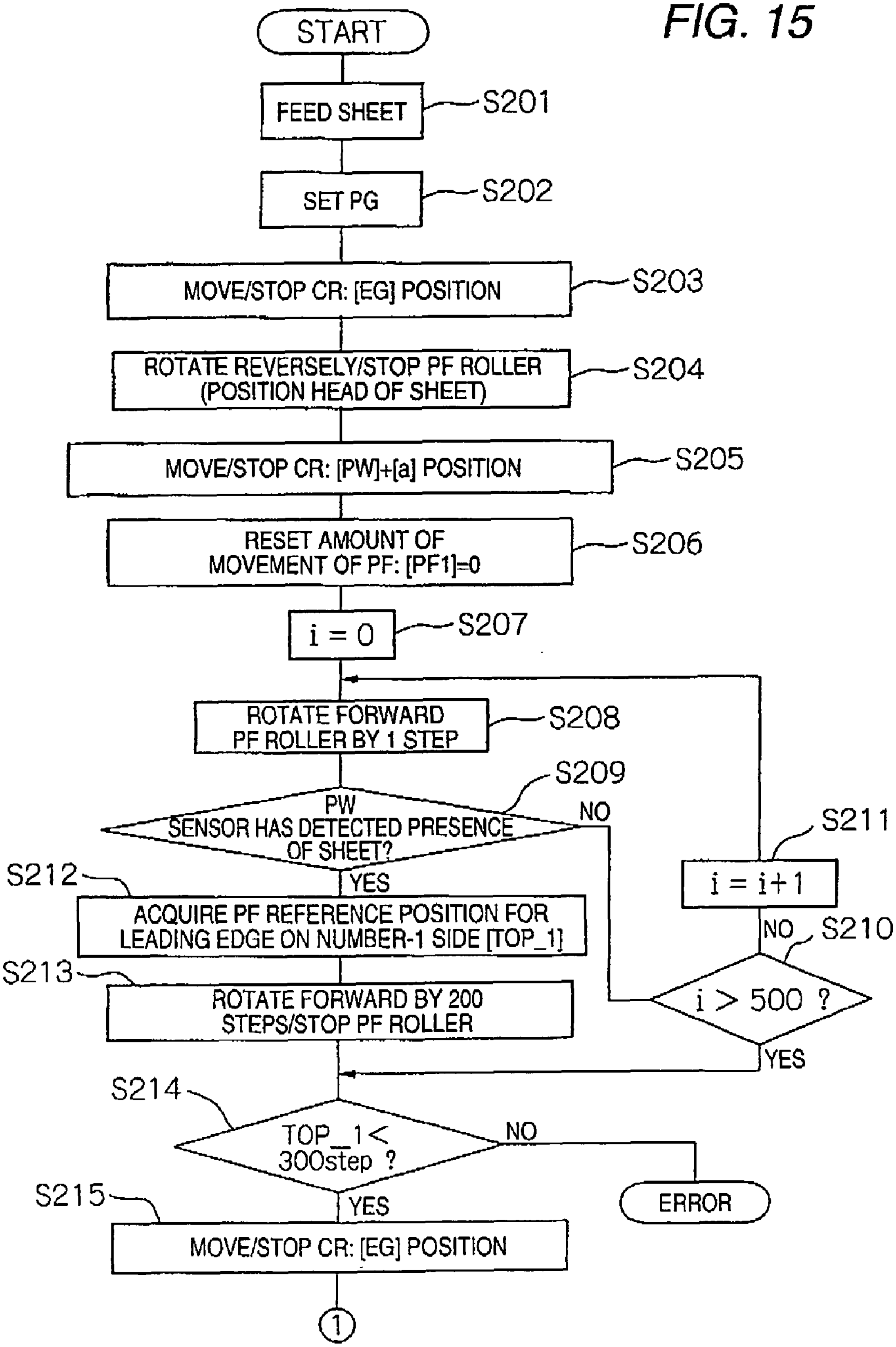
FIG. 15 is a flowchart showing procedures employed at the time of formation of the correction value obtainment pattern.
Figure 16:
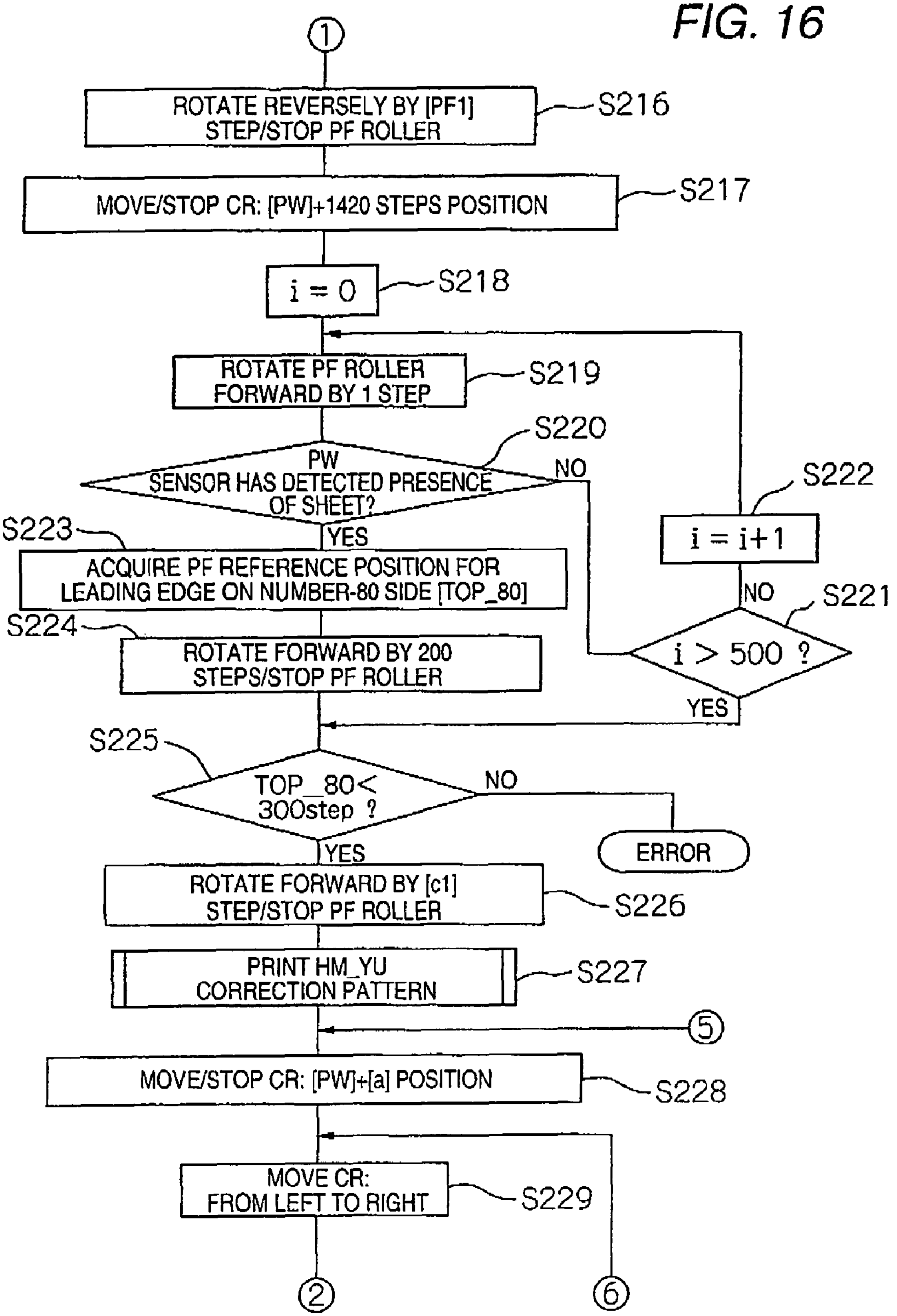
FIG. 16 is a flowchart showing procedures employed at the time of formation of the correction value obtainment pattern.
Figure 17:
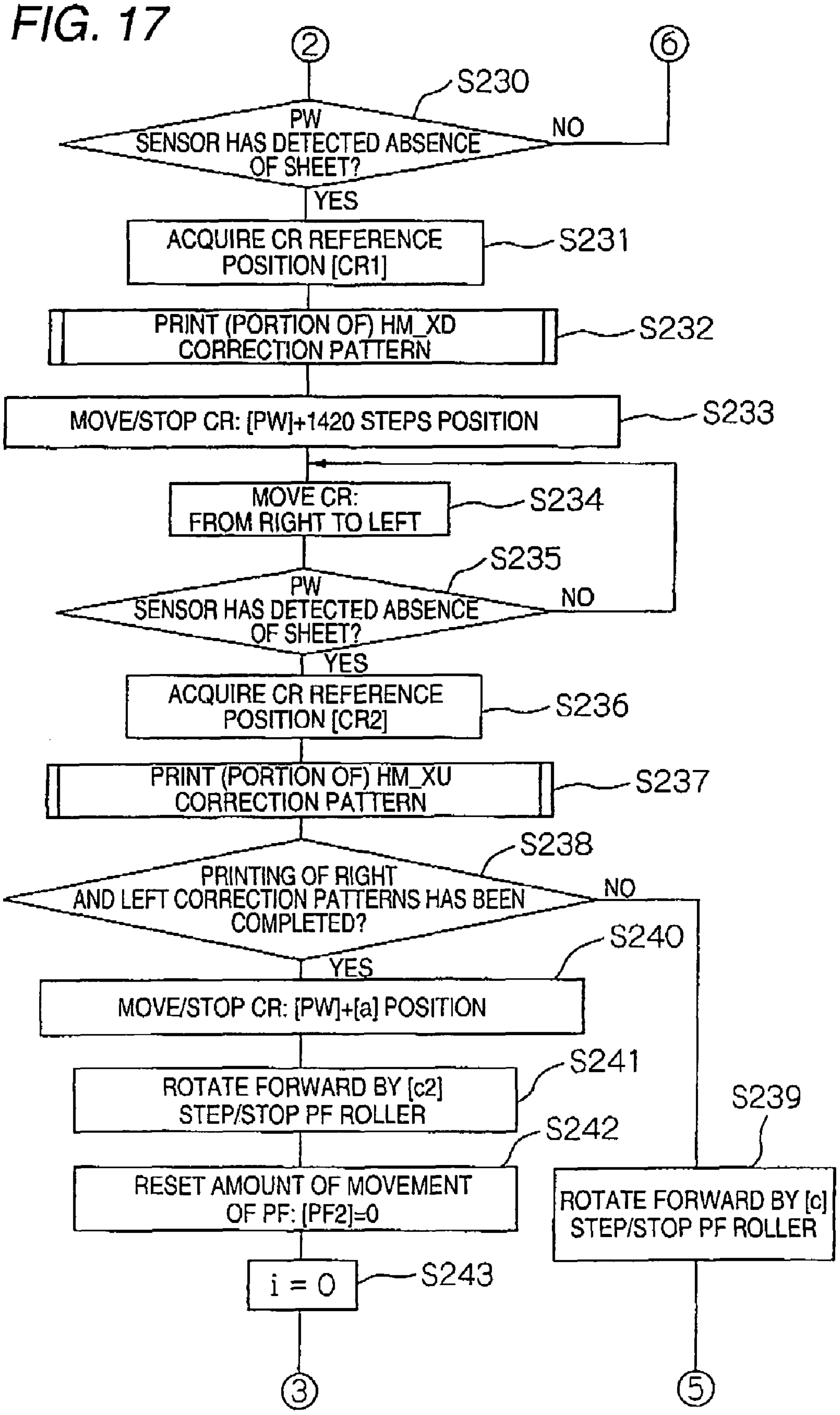
FIG. 17 is a flowchart showing procedures employed at the time of formation of the correction value obtainment pattern.
Figure 18:
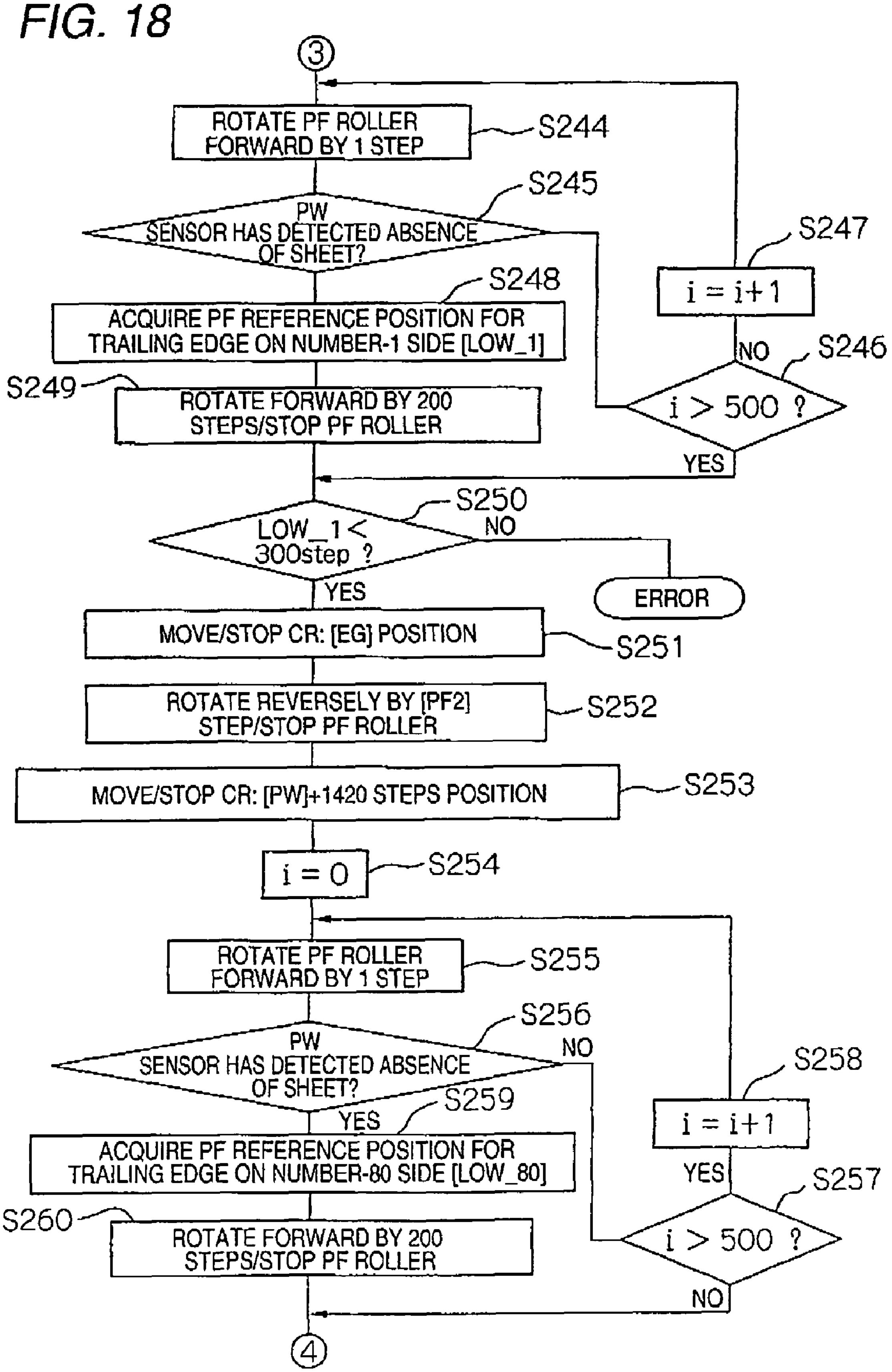
FIG. 18 is a flowchart showing procedures employed at the time of formation of the correction value obtainment pattern.
Figure 19:
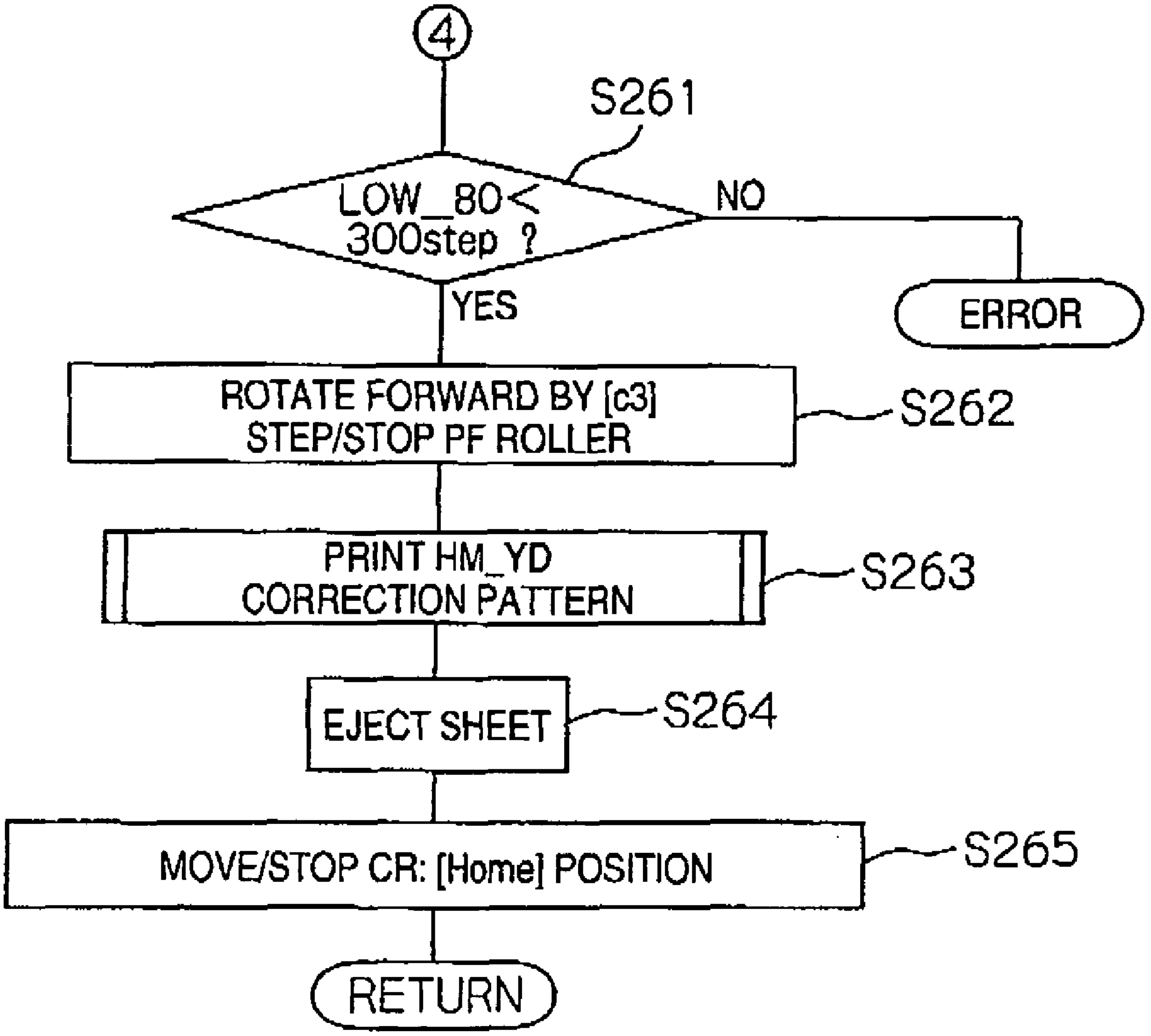
FIG. 19 is a flowchart showing procedures employed at the time of formation of the correction value obtainment pattern.

Subsequently, a second embodiment will be described by reference to FIGS. 13 to 19. FIG. 13 is a view showing that the correction value obtainment pattern 200 is formed along the leading edge of the sheet; FIG. 14 is a view showing that the correction value obtainment pattern 200 is formed along the trailing edge of the sheet; and FIGS. 15 to 19 are flowcharts showing procedures for forming the correction value obtainment pattern along the upper and trailing edges and the right and left sides of the sheet P.

The correction value obtainment pattern 200 shown in FIG. 13 is analogous to that shown in FIG. 8, but differs from the first embodiment in terms of a method for detecting the leading edge of the sheet.

Specifically, when the leading edge of the sheet P has an inclination angle θ with respect to the line parallel to the direction "x" as shown in FIG. 13, the detected position of the leading edge additionally includes an error attributable to the inclination.

Therefore, in the present embodiment, the position of the leading edge of the sheet is acquired as two points while being spaced apart from each other, as appropriate, in the direction "x." The degree of inclination (an inclination angle θ) of the leading edge with respect to the line parallel to the direction "x" is determined by reference to the two points of the edge position. By reference to the degree of inclination, there is determined the detection error Hb of the optical sensor attributable to the inclination of the leading edge with respect to the line parallel to the main scanning direction. The sum of the detection error Hb and the detection error Hr acquired by the same method as that described in connection with the first embodiment is taken as the absolute value of the correction value Hp of the PW sensor 80.

In the second embodiment which will be described below, error factors induced by inclination of the leading or trailing edge with respect to the line parallel to the direction "x" are eliminated on the above-described principle. In FIG. 13, reference symbols [TOP_1] and [TOP_80] denote the position of the leading edge to be detected by means of the sensing operation of the PW sensor 80 (in a direction designated by; e.g., HM_YU in FIG. 7). From the center coordinates of the two detected edge positions in the direction "x" and "y," the drive control section 60 determines the position of [TOP_0*c*] serving as an [intermediate position xc] which is a midpoint between [TOP_1] and [TOP_80] by means of computation.

There is formed the correction value obtainment pattern 200 by use of the nozzle #48 and nozzles before and after that nozzle, wherein the correction value obtainment pattern 200 includes the reference line (#0) parallel to the direction "x" at the position spaced over the distance Lr along the direction "y" from [TOP_0*c*], and lines parallel to the direction "x") are formed stepwise (as a step shape) so as to be spaced at a given interval (e.g., 1/180 inches) along the direction "y."

Numbers (#-3 to #3) used for identifying the respective lines in the correction value obtainment pattern 200 are recorded in the vicinity of the respective lines in FIG. 13. In the embodiment shown in FIG. 13, on the assumption that a line satisfying the distance Lr is determined to be, e.g., line #2, through actual measurement, a distance between the reference line and the #2 line in the direction "y" (a detection error attributable to an error in attachment of the PW sensor 80 and the accuracy of detection of the PW sensor 80) is denoted by reference symbol Hr. In the present embodiment, when a line formed at a position spaced from the leading edge by a distance Lr is specified, actual measurement is performed by means of a line which passes through a midpoint between the lines and parallel to the direction "y" (reference symbol [TL_2*c*] and [TL_0*c*] in FIG. 13 depict a midpoint of the line #2 and a midpoint of the reference line #0).

Reference symbol Lv in FIG. 13 denotes a distance from the midpoint [TL_0*c*] of the reference line #0 to the leading edge in the direction "y." As is evident from FIG. 13, a distance Hb in the direction "y" from a point of intersection [TOP_2*c*] of the straight line—which is parallel to the direction "y" and passes through the midpoint [TL_2*c*] of the line #2—and the leading edge to [TOP_0*c*] becomes an error attributable to the inclination of the leading edge. In the example shown in FIG. 13, a relationship of $Lr=Lv+Hr+Hb$ (mm) stands. The distance Hb can be determined by $Hb=x\cdot w\cdot \tan\theta$, where "x" denotes a line number ("2" in the embodiment shown in FIG. 13) and "w" denotes the length of each line in the direction "x" (the respective lines have a constant length). Given that there stands $W=x\cdot w$, reference symbol W denotes a distance from the midpoint of the specified line ([TL_2*c*] in the embodiment shown in FIG. 13) to [TOP_0*c*] in the main scanning direction. As in the case of the first embodiment, Hr can be determined by equation of $Hr=x\cdot(1/180)\cdot 25.4$ (mm).

As above, the operator specifies a line formed at a position spaced from the leading edge by the distance Lr (mm). The operator transmits the thus-specified number "x" to the drive control section 60 as information about the specified line by utilization of the host computer 150 (FIG. 4). The drive control section 60 having received the number "x" acquires the error Hb determined from the detection error Hr and the inclination by means of the above equation, and stores the error into the storage unit (e.g., EEPROM 65 shown in FIG. 4). In subsequent operations, when the position of the leading or trailing edge of the sheet P has been detected, the correction values Hb, Hr are added to the detected edge position (coordinates in the direction "y"), thereby correcting the detection error.

Procedures for forming the correction value obtainment pattern along the leading and trailing edges and the right and left side edges of the sheet P will be described by reference to FIGS. 15 through 19.

First, the sheet P is fed (step S201), and a PG suitable for the fed sheet P is set (step S202). As is the case of the first embodiment, custom-designed paper having a coating layer is used for the sheet P.

Next, the CR 33 is placed at a predetermined position ([EG] position) (step S203). After having been reversely rotated over a predetermined distance, the PF roller 30 is stopped (step S204); namely, the head of the sheet is positioned. In the printer 1 of the present embodiment, an unillustrated power transmission switchover device is switched, by means of reverse rotation of the PF motor 30, to a state where power of the PF motor 72 (FIG. 4) is transmitted to another driving object (e.g., the feeder 2 (FIG. 2), an unillustrated pumping device, and the like). Accordingly, before the PF motor 30 is reversely rotated, the CR 33 is placed at a predetermined position ([EG] position). Specifically, when the CR 33 is located at the [EG] position, the power transmission switchover device is not switched to a state where power is transmitted to another driving object even when the PF roller 30 is reversely rotated (the same also applies to any counterparts in the following descriptions). By means of positioning the head of the sheet mentioned above, the optical center 80*a* of the PW sensor 80 is positioned at a location (on the sheet-absence side) spaced a predetermined distance (e.g., 3 to 5 mm or thereabouts) from the leading edge of the sheet in the direction "y."

Subsequently, the CR 33 is placed at [PW]+[a] position ([PW] hereinbelow designates the position of the side edge of the sheet detected by the PW sensor 80) (step S205). Thereby, the optical center 80*a* of the PW sensor 80 is located at a position (on the sheet-presence side) which is inwardly separated about 5 mm or thereabouts in the direction "x" from the side edge on the number-1 side of the sheet. Subsequently, [PF1] showing the amount of movement of PF [the amount of rotation of the PF roller 30 (the number of steps which are counted by a pulse output from the rotary encoder 78 (FIG. 4)): the same also applies to any counterparts in the following descriptions] is reset to zero (step S206). A variable "i" showing a count value is reset to zero (step S207).

Forwardly rotating the PF roller 30 by one step and incrementing the count variable "i" are repeated until the PW sensor 80 detects presence of a sheet (steps S208 to S211). Specifically, this sensing corresponds to sensing denoted by HM_YU in FIG. 7.

When presence of a sheet cannot be detected even after the PF roller 30 has been rotated by a predetermined amount (e.g., 500 steps), an error is deemed to have arisen, and processing proceeds to step S214 (when an affirmative branch is selected in step S210).

A location where presence of a sheet has been detected is acquired as the position of [TOP_1] in the direction "y" (PF reference position for the leading edge on the number-1 side) (step S212). After having been rotated forward over a predetermined distance (by 200 steps from [TOP_1]), the PF roller 30 is stopped (step S213). When the amount of feeding of the sheet achieved when the sheet has been detected exceeds 300 (steps), an error is deemed to have arisen (when a negative branch is selected in step S214), and processing is completed.

When the CR 33 is placed at a predetermined position ([EG] position) (step S215), and the PF roller 30 is stopped after having been reversely rotated over a predetermined distance ([PF1] step) (step S216). As a result, the optical center 80*a* of the PW sensor 80 is positioned at a place (on the sheet-absence side) which is spaced a predetermined distance (e.g., 3 to 5 mm or thereabouts) from the leading edge of the sheet in the direction "y."

Next, the CR 33 is placed at [PW]+1420-step position [e.g., the position of the CR where the optical center 80*a* of the PW sensor 80 is located at a position (on the sheet-presence side) which is spaced inwardly about 5 mm from the side edge on the number-80 side of the sheet in the direction "x"] (step S217), and the variable "i" indicating a count value is reset to 0 (step S218).

Forwardly rotating the PF roller 30 by one step and incrementing the count variable "i" are repeated until the PW sensor 80 detects presence of a sheet (steps S219 to S222). Specifically, this sensing corresponds to sensing denoted by HM_YU in FIG. 7.

When presence of a sheet cannot be detected even after the PF roller 30 has been rotated by a predetermined amount (e.g., 500 steps), an error is deemed to have arisen, and processing proceeds to step S225 (when an affirmative branch is selected in step S221).

A location where presence of a sheet has been detected is acquired as the position of [TOP_80] in the direction "y" (PF reference position for the leading edge on the number-80 side) (step S223). After having been forwardly rotated over a predetermined distance (by 200 steps from [PF2]), the PF roller 30 is stopped (step S224). When the amount of feeding of the sheet achieved when the sheet has been detected exceeds 300 (steps), an error is deemed to have arisen (when a negative branch is selected in step S225), and processing completed.

Next, the PF roller 30 is stopped after having been forwardly rotated by [c1] step (step S226). The value of [c1] is determined from the positions of [TOP_1 and [TOP_80] in the direction "y" by means of, e.g., an equation of [(TOP_1+TOP_80)/2]+[b]-(TOP_80_200). By means of the operation, nozzle #48 is located at a position (on the sheet-presence side) which is separated inwardly a distance Lr (mm) in the direction "y" from the position of the leading edge of the sheet [TOP_0*c*] (FIG. 13) acquired by means of sensing of the leading edge of the sheet performed by the PW sensor 80.

The HM_YU correction pattern is printed along the leading edge of the sheet (step S227). This correction pattern is the correction value obtainment pattern 200 shown in FIG. 13, and the reference line (#0) is formed by use of #48 nozzle.

Subsequently, the CR 33 is placed at [PW]+[a] position [The position of the CR where the optical center 80*a* of the PW sensor 80 is located at a position (the sheet-presence side) which is separated inwardly 5 mm or thereabouts from the side edge on the number-1 side of the sheet in the direction "x" ](step S228). The PW sensor 80 detects absence of a sheet (step S230) while the CR 33 is moved from left to right (from the number-80 side to the number-1 side) (step S229). Specifically, this sensing corresponds to sensing designated by HM_XD of FIG. 7.

A location where sheet absence has been detected is acquired as an edge position on the number-1 side of the sheet P in the direction "x" (the CR reference position [CR1]) (step S231). A portion of the HM_XD correction pattern is printed while the CR 33 is moved from right to left (from the number-1 to the number-80) (step S232). The correction pattern printed in this step is a portion of the correction value obtainment pattern 300 shown in FIG. 9 (corresponding to; e.g., three lines).

Subsequently, the CR 33 is being moved to [PW]+[1420]-position [e.g., the position of the CR where the PW sensor 80 is located at a position (on the sheet-presence side) which is spaced inwardly about 5 mm from the side edge on the number-80 side of the sheet in the direction "x"]. The PW sensor 80 detects absence of a sheet (step S235) while the CR 33 is being moved from right to left (from the number-1 side to the number-80 side) (step S234). Specifically, this sensing corresponds to sensing designated by HM_XU of FIG. 7.

A location where absence of a sheet has been detected is acquired as the edge position on the number-80 side of the sheet P in the direction "x" (CR reference position [CR2]) (step S236), a portion of the HM_XU correction pattern is printed while the CR 33 is being moved from left to right (from the number-80 side to the number-1 side) (step S237). The correction pattern printed in this step is a portion of a correction value obtainment pattern which is a mirror image of the correction value obtainment pattern 300 shown in FIG. 9 (corresponding to; e.g., three lines).

Next, a determination is made to whether or not printing of all the right and left correction value obtainment patterns has been completed (step S238) When printing has not been completed (when a negative branch has been selected), the PF roller 30 is rotated forward over a predetermined distance ([c] steps) (step S239). Subsequently, the sheet is fed for further printing the next right and left patterns, and processing returns to step S228. Subsequently, these operations are repeated.

When printing of all the right and left correction value obtainment patterns has been completed (an affirmative branch has been selected in step S238), the CR 33 is placed at a predetermined position ([PW]+(a) position; for example, the position of the CR where the optical center 80*a* of the PW sensor 80 is located at a position which is spaced inwardly about 5 mm from the side edge on the number-1 side of the sheet in the direction "x") (step S240). Subsequently, the PF roller 30 is rotated forward by [c2] steps (step S241), whereby the optical center 80*a* of the PW sensor 80 is positioned at a position (on the sheet-presence side) which is spaced inwardly a predetermined distance (e.g., 5 to 7 mm or thereabouts) in the direction "y" from the trailing edge of the sheet.

Subsequently, [PF2] indicating the amount of movement of PF is reset to zero (step S242), and the variable "i" indicating a count value is reset to 0 (step S243). Forwardly rotating the PF roller 30 by one step and incrementing the count variable "i" are repeated until the PW sensor 80 detects presence of a sheet (steps S244 to S247). Specifically, this sensing corresponds to sensing denoted by HM_YD in FIG. 7. When presence of a sheet cannot be detected even after the PF roller 30 has been rotated by a predetermined amount (e.g., 500 steps), an error is deemed to have arisen, and processing proceeds to step S249 (when an affirmative branch is selected in step S246).

A location where absence of a sheet has been detected is acquired as the position of [LOW_1] in the direction "y" (a Pf reference position for the trailing edge on the number-1 side) (step S248). After having been rotated forward over a predetermined distance (by 200 steps from [LOW_1]), the PF roller 30 is stopped (step S249). When the amount of feeding of the sheet achieved when the sheet has been detected exceeds 300 (steps), an error is deemed to have arisen (a negative branch is selected in step S250).

When the CR 33 is placed at a predetermined position ([EG] position) (step S251), and the PF roller 30 is stopped after having been reversely rotated over a predetermined distance ([PF2] step) (step S252). As a result, the optical center 80*a* of the PW sensor 80 is positioned at a place (on the sheet-presence side) which is spaced a predetermined distance (e.g., 5 to 7 mm or thereabouts) from the trailing edge of the sheet in the direction "y."

Next, the CR 33 is placed at [PW]+1420-step position [e.g., the position of the CR where the PW sensor 80 is located at a position which is spaced inwardly about 5 mm from the side edge on the number-80 side of the sheet in the direction "x"] (step S253), and the variable "i" indicating a count value is reset to 0 (step S254). Forwardly rotating the PF roller 30 by one step and incrementing the count variable "i" are repeated until the PW sensor 80 detects presence of a sheet (steps S255 to S258). Specifically, this sensing corresponds to sensing denoted by HM_YD in FIG. 7. When presence of a sheet cannot be detected even after the PF roller 30 has been rotated by a predetermined amount (e.g., 500 steps), an error is deemed to have arisen, and processing proceeds to step S260 (when an affirmative branch is selected in step S257).

A location where absence of a sheet has been detected is acquired as the position of [LOW_80] in the direction "y" (PF reference position for the trailing edge on the number-80 side) (step S259). After having been rotated forward over a predetermined distance (by 200 steps from [LOW_80]), the PF roller 30 is stopped (step S260). When the amount of feeding of the sheet achieved when the sheet has been detected exceeds 300 (steps), an error is deemed to have arisen (a negative branch is selected in step S261).

Next, the PF roller 30 is stopped after having been forwardly rotated by [c3] step (step S262). The value of [c3] is determined from the positions of [LOW_1] and [LOW_80] in the direction "y" by means of, e.g., an equation of [(LOW_1+LOW_80)/2]+[d]-(LOW_80−200). By means of the operation, nozzle #48 is located at a position (on the sheet-presence side) which is separated inwardly a distance Lr(mm) in the direction "y" from the position of the trailing edge of the sheet [LOW_0*c*] (FIG. 14) acquired by means of sensing of the trailing edge of the sheet performed by the PW sensor 80.

The HM_YD correction pattern is printed along the trailing edge of the sheet (step 263). This correction pattern corresponds to the correction value obtainment pattern 200 shown in FIG. 14, and the reference line (#0) is formed by use of nozzle #48.

Subsequently, the sheet P is ejected (step S264), and the CR 33 is returned to the [Home] position (step S265). Processing returns to a higher-level routine.

Through above processing, the correction value obtainment pattern is formed along the leading and trailing edges and the right and left side edges of the sheet.

By means of actual measurement, the operator specifies a line at a position spaced the distance Lr (mm) from each edge. The number (#−3 to #3) is input to the host computer 150 (FIG. 4). Upon receipt of the thus-input line number "x," the drive control section 60 determines the detection error Hr in each of the sensing directions HM_XD, HM_XU by means of $Hr=x\cdot(1/180)\cdot 25.4$ (mm), and the value is written as the correction value Hp in EEPROM 65 (FIG. 4).

An inclination angle θ of the leading edge and that of the trailing edge are determined in connection with each of the sensing directions HM_YU, HM_YD. As mentioned previously, the detection error Hr and the error Hb attributable to the inclination of the leading or trailing edge are determined respectively. Values of these errors are written in the EEPROM 65 (FIG. 4).

In subsequent processing operations, when sensing is effected in each of the sensing directions, the corresponding correction value Hp is added to each of the detected edge values, thereby obtaining an accurate edge position.

The above embodiment is an example. There may be adopted any method, so long as a correction value for the PW sensor 80 is determined by means of printing a reference line from the edge position acquired by means of sensing operation of the PW sensor 80 to a predetermined position, and actually measuring the distance from the reference line to the edge. Further, there may also be adopted any method, so long as the inclination of the leading or trailing edge of the sheet is determined, and the degree of inclination is reflected on the correction value for the PW sensor 80.

In the first embodiment, the detection error Hr of the PW sensor 80 is stored in the EEPROM 65 (FIG. 4) as the correction value Hp. In the second embodiment, the detection error Hr and the error Hb attributable to the inclination of the leading and trailing edges are stored in the EEPROM 65. However, for instance, the line number (x) localized by the operator is stored in its present form. When the PW sensor 80 actually detects an edge position, the correction value Hp may be calculated as needed. The unit [(mm),(inch), etc] of the correction value Hp used at the time of storage of the correction value Hp may be any unit.

The embodiments have described the case where the inkjet printer is used as an example recording apparatus. However, the present invention can also be widely applied to a liquid ejection apparatus.

The term "liquid ejection apparatus" is not limited to recording apparatus such as a printer which uses an inkjet recording head; a printer for subjecting a recording medium to recording by means of ejecting ink from the recording head; a copier; a facsimile, and the like. In addition to them, the liquid ejection apparatus includes an apparatus which ejects in place of ink a liquid appropriate to an application of the recording apparatus from a liquid ejection head corresponding to the inkjet recording head, to thus cause the liquid to adhere to the medium to be ejected.

In addition to including the recording head, the liquid ejection head includes a coloring material ejection head used for manufacture of a color filter such as a liquid-crystal display; an electrode material (conductive paste) ejection head used for forming an electrode such as an organic EL display, surface-emitting display (FED), or the like; a bio-organic material ejection head used for manufacturing biotips or the like; a sample ejection head used as a precision pipette; and the like.

What is claimed is:

1. A method of obtaining a correction value used for correcting a detection error in an optical sensor opposing a transport path in which a medium is transported and operable to detect a change in optical reflectance of the transport path to thereby detect an edge of the medium so as to generate detection information, the method comprising:

acquiring edge information on an edge position of one of opposite edges of the medium based on the detection information;

recording on the medium a correction value obtainment pattern including a plurality of lines that are arranged at a fixed interval in a first direction and parallel to a second direction perpendicular to the first direction and that include a reference line which is located at a position spaced a first distance from the edge position in the first direction and which is parallel to the second direction, based on the edge information;

selecting one line from the plurality of lines of the correction value obtainment pattern to specify a line which is located at a position spaced a second distance from the edge position in the first direction and which corresponds to one of the plurality of lines of the correction value obtainment pattern, by means of actual measurement performed by an operator;

obtaining a third distance in the first direction between the specified line and the reference line, based on line information on the specified line; and determining the third distance as an absolute value of the correction value.

2. The method according to claim 1, wherein the first direction is a main scanning direction, the second direction is a sub scanning direction, and the opposite edges of the medium are opposite edges of the medium in the second direction.

3. The method according to claim 1, wherein the first direction is a sub scanning direction, the second direction is a main scanning direction, and the opposite edges of the medium are a leading edge and a trailing edge of the medium in the first direction.

4. The method according to claim 3, wherein in the acquiring process of the edge information, the edge position includes two edge points spaced at a predetermined interval from each other in the second direction, the method further comprising:

obtaining an inclination angle between a line connecting the two edge points and a line parallel to the second direction based on the edge information; and obtaining an inclination error caused by inclination of the medium with respect to the line parallel to the second direction, based on the inclination angle, and in the determining process, a sum of the third distance and the inclination error is determined as the absolute value of the correction value.

5. The method according to claim 4, further comprising:

obtaining an intermediate point between the two edge points, and obtaining a fourth distance in the second direction between an intermediate point of the specified line and the intermediate point between the two edge points, wherein the inclination error is defined as Hb, the fourth distance is defined as W, and the inclination angle is defined as θ, such that the following equation is satisfied, $$Hb = W \times \tan\theta.$$

6. The method according to claim 4, further comprising:

obtaining an intermediate point between the two edge points, wherein an intermediate point of the reference line corresponds to the intermediate point between the two edge points in the first direction.

7. The method according to claim 1, wherein the first distance between the position of the reference line and the edge position is an ideal design value, and the second distance between the position of the specified line and the edge position is actually measured by the operator.

8. The method according to claim 1, wherein the first distance between the position of the reference line and the edge position is predetermined, and the second distance between the position of the specified line and the edge position is actually measured by the operator.

9. A recording apparatus comprising:

a transporter, operable to transport a recording medium in a transport path;

an optical sensor, opposing the transport path, and operable to detect a change in optical reflectance of the transport path to thereby detect an edge of the recording medium so as to generate detection information;

a controller, operable to acquire edge information on an edge position of one of opposite edges of the recording medium based on the detection information, the controller operable to cause a recording head to record on the recording medium a correction value obtainment pattern including a plurality of lines that are arranged at a fixed interval in a first direction and parallel to a second direction perpendicular to the first direction and that include a reference line which is located at a position spaced a first distance from the edge position in the first direction and which is parallel to the second direction, based on the edge information; and an ejector, operable to eject the recording medium on which the correction value obtainment pattern has been recorded, wherein the controller receives an input to select one line from the plurality of lines of the correction value obtainment pattern to specify a line which is located at a position spaced a second distance from the edge position in the first direction from among the plurality of lines of the correction value obtainment pattern, and the controller obtains an absolute value of a correction value used for correcting a detection error in the optical sensor in accordance with the input.

10. The recording apparatus according to claim 9, wherein the first direction is a main scanning direction, the second direction is a sub scanning direction, and the opposite edges of the recording medium are opposite edges of the recording medium in the second direction.

11. The recording apparatus according to claim 9, wherein the first direction is a sub scanning direction, the second direction is a main scanning direction, and the opposite edges of the recording medium are a leading edge and a trailing edge of the recording medium in the first direction.

12. The recording apparatus according to claim 11, wherein the edge position includes two edge points spaced at a predetermined interval from each other in the second direction, the controller obtains an inclination angle between a line connecting the two edge points and a line parallel to the second direction based on the edge information, the controller obtains an inclination error caused by inclination of the recording medium with respect to the line parallel to the second direction based on the inclination angle, the controller obtains a third distance in the first direction between the specified line and the reference line based on the input, and the controller determines a sum of the third distance and the inclination error as the absolute value of the correction value.

13. The recording apparatus according to claim 12, wherein the controller obtains an intermediate point between the two edge points, the controller obtains a fourth distance in the second direction between an intermediate point of the specified line and the intermediate point between the two edge points, and the inclination error is defined as Hb, the fourth distance is defined as W, and the inclination angle is defined as θ, such that the following equation is satisfied, $$Hb = W \times \tan\theta.$$

14. The recording apparatus according to claim 12, wherein the controller obtains an intermediate point between the two edge points, and an intermediate point of the reference line corresponds to the intermediate point between the two edge points in the first direction.

15. The recording apparatus according to claim 9, wherein the first distance between the position of the reference line and the edge position is an ideal design value, and the second distance between the position of the specified line and the edge position is actually measured by an operator.

16. The recording apparatus according to claim 9, wherein the first distance between the position of the reference line and the edge position is predetermined, and the second distance between the position of the specified line and the edge position is actually measured by an operator.

* * * * *